United States Patent [19]

Statt et al.

[11] Patent Number: 5,237,655
[45] Date of Patent: Aug. 17, 1993

[54] RASTER IMAGE PROCESSOR FOR ALL POINTS ADDRESSABLE PRINTER

[75] Inventors: David J. Statt; William E. Hunt, both of Rochester; Mark R. Warda, Fairport; Theodore Huthsteiner, Rochester, all of N.Y.

[73] Assignee: Eastman Kodak Company, Rochester, N.Y.

[21] Appl. No.: 548,660

[22] Filed: Jul. 5, 1990

[51] Int. Cl.⁵ .................. G06F 15/20; G06F 15/00
[52] U.S. Cl. .................. 395/162; 395/117; 395/137; 395/166
[58] Field of Search ............ 395/117, 137, 144–148, 395/150, 162, 166, 112, 142; 340/727; 382/46; 358/296

[56] References Cited

U.S. PATENT DOCUMENTS

| | | | |
|---|---|---|---|
| 4,300,206 | 11/1981 | Belleson et al. | 395/147 |
| 4,648,045 | 3/1987 | Demetrescu | 395/163 |
| 4,722,064 | 1/1988 | Suzuki | 395/114 |
| 4,771,340 | 9/1988 | Notermans | 358/296 |
| 4,849,910 | 7/1989 | Jacobs et al. | 395/142 |
| 4,891,768 | 1/1990 | Willems et al. | 395/164 |
| 4,905,166 | 2/1990 | Schuerman | 395/142 |
| 4,949,499 | 7/1990 | Asari et al. | 395/164 |
| 5,003,496 | 3/1991 | Hunt, Jr. et al. | 395/166 |
| 5,075,874 | 12/1991 | Steeves et al. | 395/112 |
| 5,087,979 | 2/1992 | Schaerfel | 358/296 |
| 5,109,476 | 4/1992 | Thompson | 395/112 |

FOREIGN PATENT DOCUMENTS 0217448 9/1986 European Pat. Off. .
0218287 4/1987 European Pat. Off. .

Primary Examiner—Dale M. Shaw
Assistant Examiner—Kee M. Tung
Attorney, Agent, or Firm—Mark Z. Dudley

[57] ABSTRACT

A raster image processor for an all points addressable printer includes at least three digital computer controlled processing units arranged in a parallel processing pipe line. The first unit is a master processing unit that receives printing instructions and generates rendering commands. The record unit is connected to the first unit by a dedicated bus, and receives the rendering commands over the bus and generates bit maps corresponding to the rendering commands. The third unit is a memory unit connected to the second unit by a second dedicated bus, and receives the bit maps from the second unit and stores them in a page memory. All three units are connected by a communications and control bus for overall coordination of the units.

17 Claims, 18 Drawing Sheets

RASTER IMAGE PROCESSOR FOR ALL POINTS ADDRESSABLE PRINTER

TECHNICAL FIELD

The invention relates to raster image processors for converting printer commands to bitmap data, and driving an all-points addressable printer with the bitmap data.

BACKGROUND ART

High speed raster image processors (RIP's) capable of driving all points addressable printers at rates of 60 pages per minute and more are needed for driving todays high volume laser printers. An example of a RIP architecture useful for driving a high speed printer is shown in U.S. Pat. No. 4,722,064 issued Jan. 26, 1988 to Suzuki. FIG. 2 is a block diagram illustrating this prior art RIP architecture. The raster image processor generally designated 10 includes an interface 12, a control processing unit 14, a print controller 16, an element memory 18, and an image processor 20, all connected via a general purpose bus 22. The interface 12 receives print instructions from a host computer (not shown) according to a standard protocol. The central processing unit 14 is a programmed microprocessor that controls the overall operation of the RIP such as fetching print instructions from the host computer through interface 12 and storing them in element memory 18, controlling the processing of print instructions into raster information by image processor 20, and controlling the operation of a printer 24 via printer controller 16. The printer 24 for example can be an electrophotographic laser printer.

The printer controller 16 is a sequencer that controls the printer 24 by providing signals such as paper feed, advancing the photo receptor etc. The image processor 20 is a micro program element processor for converting print instructions read from the print element memory 18 into raster bitmap data, and storing the bitmap data in a raster memory 24a or 24b. The image processor 20 is connected to the raster memory 24a and 24b by a high speed bus 26. The raster bitmap data is supplied to the printer 24 by a video interface 28. The video interface is connected to the raster memories 24a and 24b by a second high speed bus 30. Although the prior art RIP architecture shown in FIG. 2 performs well up to a certain speed, there is a bottle neck that constrains further increases in speed as faster marking engines have been developed, and need to be driven at their maximum capable rate. This bottle neck is due to the fact that the general purpose bus 22 carries both overhead commands for controlling the operation of the RIP, and data transfer between the element memory 18 and image processor 20. Thus, control commands from the CPU 14 to the printer controller 16, image processor 20 and element memory 18 must time share the bus 22 with data transferred from the element memory 18 to the image processor 20, thereby limiting the maximum effective speed of operation of the RIP.

SUMMARY OF THE INVENTION

It is the object of the present invention to provide a RIP having an architecture that overcomes this bottle neck so that a faster RIP may be provided. It is a further object of the present invention to provide a RIP having a simplified architecture to reduce manufacturing cost. It is a still further object of the invention to provide a RIP having an architecture that enables the RIP to provide a variety of image processing functions.

The object of the present invention is achieved by a RIP having a minimum of three intelligent (digital computer controlled) processing units working in parallel fashion to form a rasterization pipeline. A master processing unit receives print instructions and decodes the print instructions to construct pages and documents to be printed, manages the layout of pages being constructed, manages fonts, and controls the marking engine. The master processing unit receives print instructions and processes the print instructions to produce rendering commands. The rendering commands are provided to a mapper accelerator unit over a dedicated bus. The mapper accelerator unit includes a front memory and an application specific computer for receiving the rendering commands from the master processing unit, and retrieving bitmaps from the front memory to produce bitmap data. The mapper accelerator unit supplies the bitmap data over a dedicated bus to an output processor unit which includes buffer memory and a microprocessor for controlling the output unit, maintaining the buffer memory, formatting the bitmap data, and sending the bitmap data to the marking engine. Overall communication and control between the master processing unit, the mapper accelerator unit, and the output processor unit is provided by a MULTIBUS I interface. By separating the overall control of the processing units from the data stream and providing a straight through flow of data from the marking instructions to the bitmap data provided to the marking engine, the bottle necks existing in the prior art RIP architecture are eliminated thereby enabling the RIP to operate at much higher speeds.

MODES FOR CARRYING OUT THE INVENTION

Figure 1:
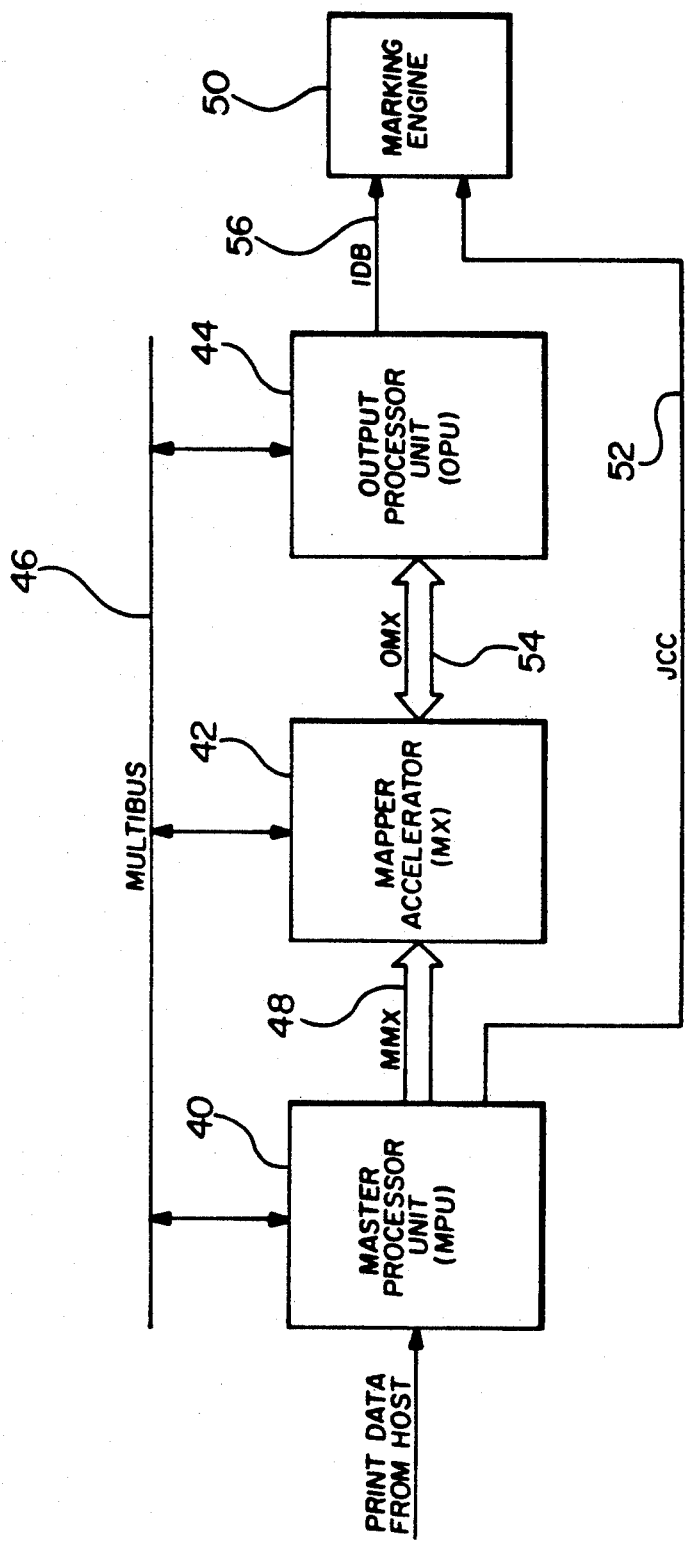
FIG. 1 is a block diagram of a raster image processor according to the present invention.
Figure 2:
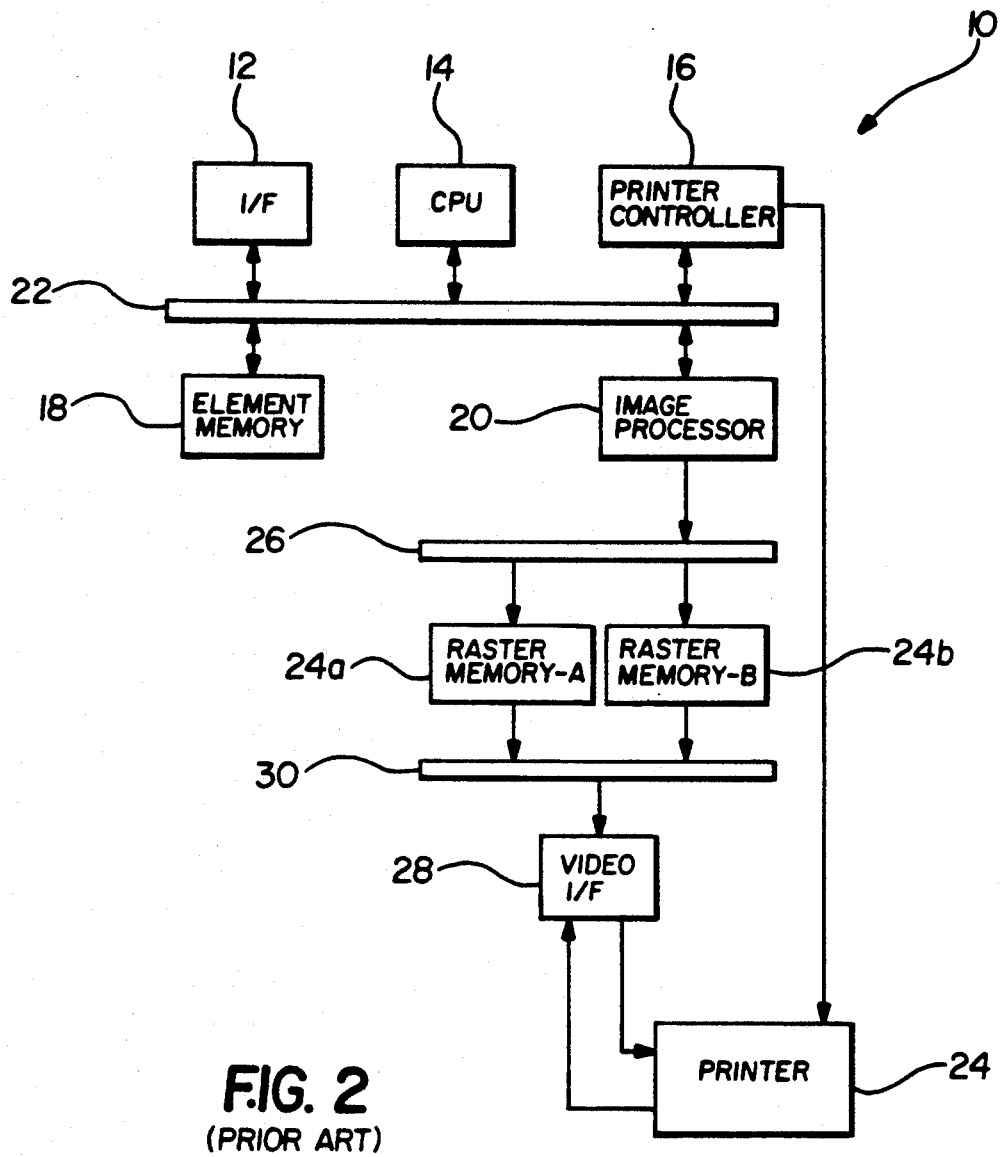
FIG. 2 is a block diagram of a prior art raster image processor.

FIG. 1 is a block diagram showing the architecture of a raster image processor according to the present invention. The raster image processor includes a master processor unit (MPU) 40, a mapper accelerator (MX) 42, and an output processor unit (OPU) 44. The master processor unit, mapper accelerator, and output processor unit are connected to a MULTIBUS I 46 for overall communication and control between the units 40, 42, and 44.

The master processor unit 40 receives print commands from a host CPU (not shown) and generates page rendering commands from the print commands. The page rendering commands are supplied to the mapper accelerator 42 on a dedicated MMX bus 48. The master processor unit 40 also provides font management, controls the operation of the marking engine 50 over a job control and communications link (JCC) 52, and provides forms and image management.

A mapper accelerator 42 receives page rendering commands from the master processor unit 40 over the MMX bus 48 thereby facilitating the rapid transfer of character bitmaps to OPU memory. The mapper accelerator 42 includes the font and pattern memories holding the bitmaps. The bitmaps are retrieved from the font memories in response to the page rendering commands. Mapper accelerator 42 also has the capability for trapezoidal filling, patterning, clipping, and halftone imaging. The bitmaps generated by the mapper accelerator are transferred to the output processor 44 over a dedicated OMX bus 54. The output processor unit 44 receives the bitmap patterns on the OMX bus 54, buffers the pages of bitmap data, formats the image, and transfers the image to the marking engine 50 via an image data bus (IDB) 56. The output processor unit also generates halftone tints to be applied to characters and patterns and for halftoning images. The output processor memory is double buffered so that a page or line of bitmap data may be supplied to the marking engine 50 while the next page is being generated. The architecture of the raster image processor wherein the data flow path between each processing unit (the master processor, mapper accelerator, and output processor) is over a dedicated bus, each processing unit having intelligent onboard control and an overall communications control between the units being provided by a separate shared bus, eliminates the bottle necks inherent in the prior art raster image processors, thereby providing a faster RIP.

Figure 3:
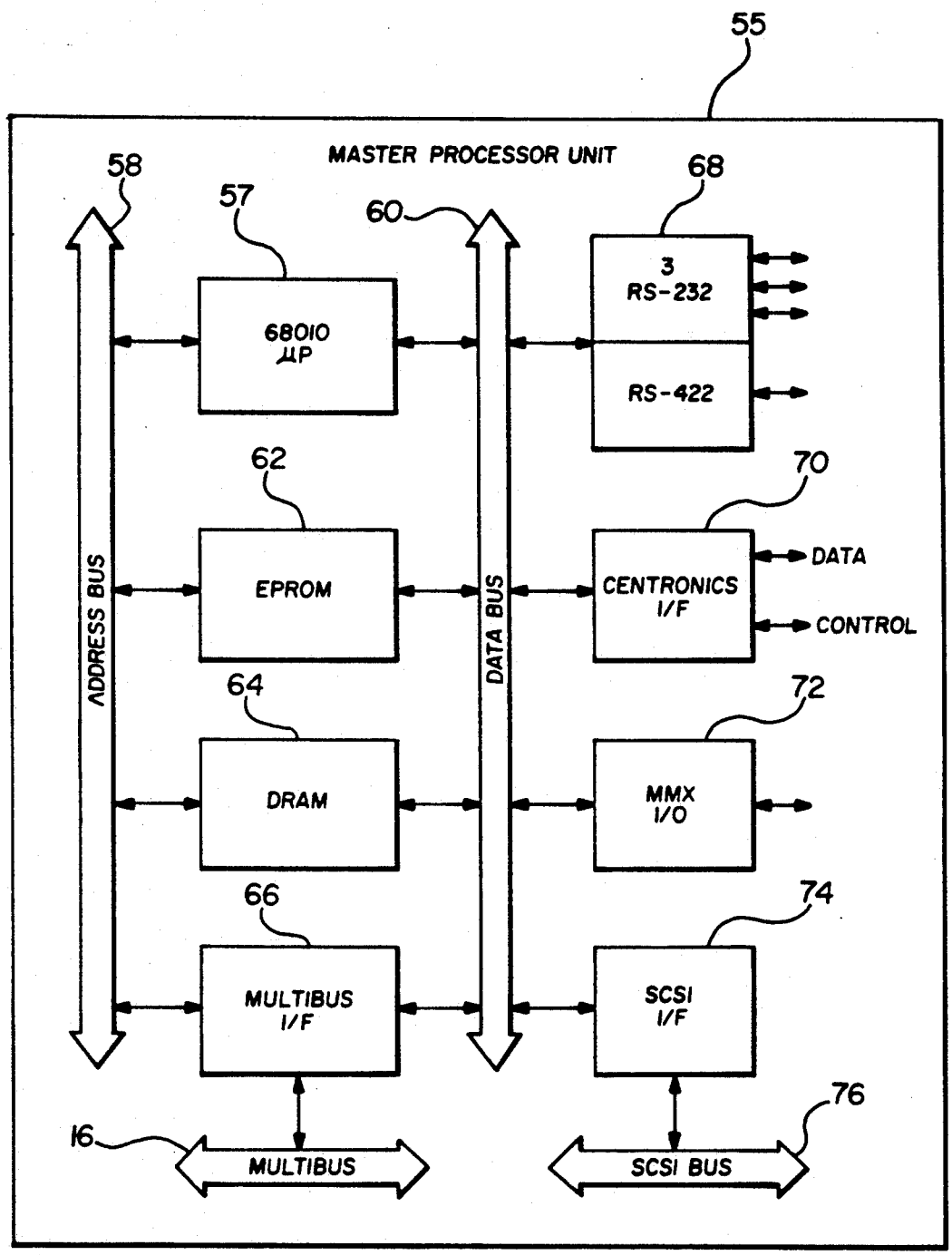
FIG. 3 is a hardware block diagram of the master processing unit shown in FIG. 1.
Figure 4:
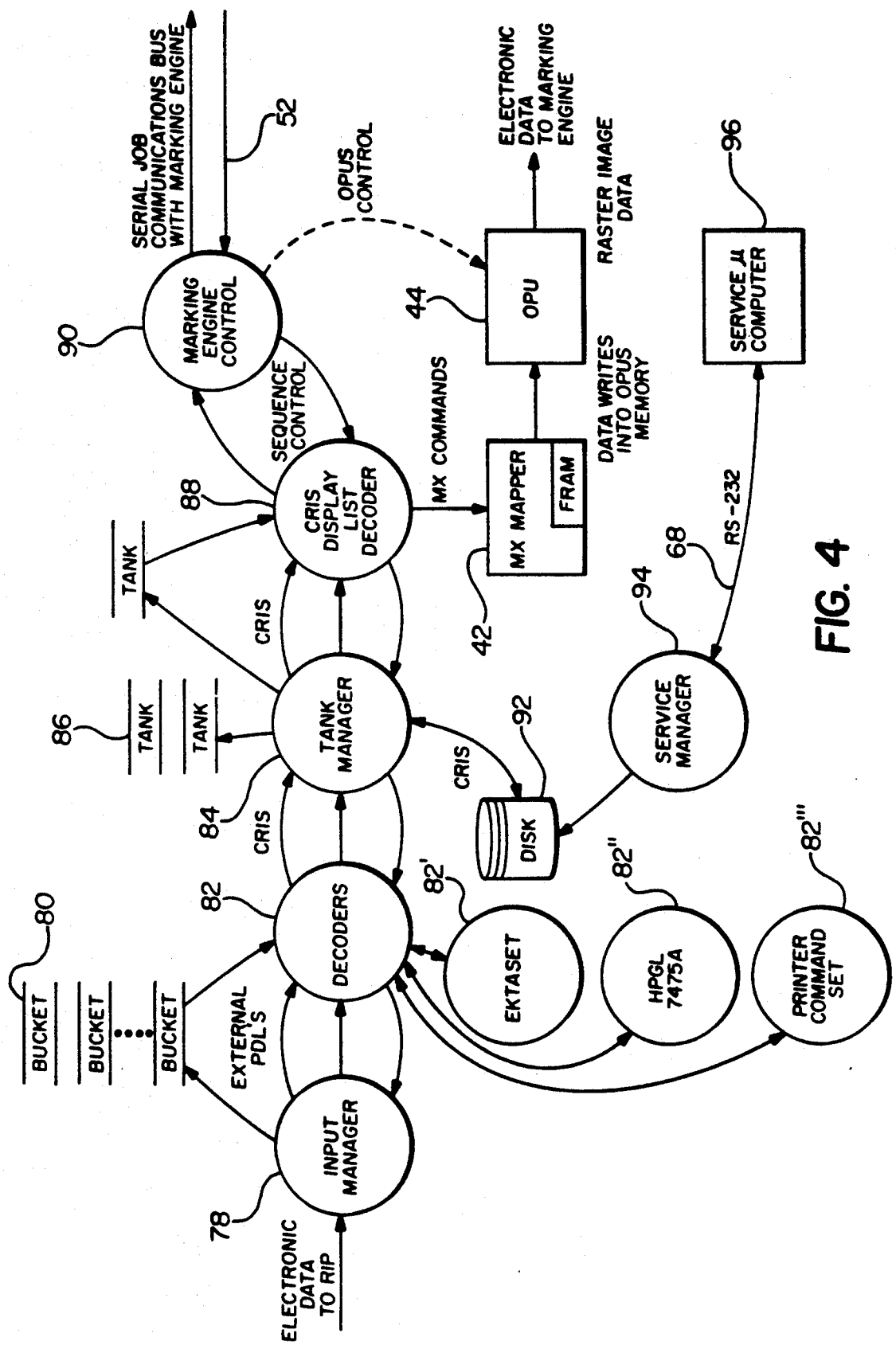
FIG. 4 is a data flow diagram showing the operation of the master processing unit.

The master processing unit (MPU) 40 will now be described in further detail with reference to FIGS. 3 and 4. The MPU 40 is embodied in a programmed microcomputer shown schematically in FIG. 3. The microcomputer generally designated 55, includes a Motorola 68010 microprocessor 57 connected to memory and interface units by an address bus 58 and a data bus 60. The memory units include eraseable programmable read only memory (EPROM) 62 and dynamic random access memory (DRAM) 64. The interface units include a MULTIBUS interface 66 connected to MULTIBUS 16, three RS-232, and one RS-422 serial I/O ports 68, a Centronics interface 70, an MMX interface 72, and a SCSI interface 74 connected to an SCSI bus 76. The microcomputer employed in the preferred embodiment of the invention is a Heurikon HK68/K10 purchased from Heurikon Corporation, Madison, Wis.

The operation of the master processing 40 will now be described with reference to the data flow diagram of FIG. 4.

Print data comprising commands in a page description language or a graphic language such as the Hewlett Packard Graphics language HPGL from the host arrives at the master processing unit 40 over either the Centronics parallel interface 70 or over one of the RS-232 serial ports 68. The input print data is first handled by an input manager 78. The input manager 78 reads the data from the active input port, and puts the data into one of up to 5 buckets 80. Each bucket is a 2K byte buffer in the DRAM 64.

The input manager 78 sends filled or partially filled buckets of input commands to the appropriate one of a plurality of decoders 82, and waits for a response from the decoder that it has finished decoding the commands in the bucket. The decoders 82, one for each page description language or graphics description language processed by the RIP, decode the print data into a set of low level instructions (common RIP instructions set CRIS) for the RIP. Appendix A contains a description of the common RIP instruction set CRIS. In the preferred embodiment, the languages include a page description language EKTASET TM Eastman Kodak (Appendix B contains a description of the EKTASET language), the Hewlett Packard Graphics Language HPGL 7475A, and a printer command set PCS that includes printer and finisher control commands such as number of copies, single or double sided copies, paper supply, stapling etc. The Printer Command Set PCS is described in Appendix C. The decoded RIP instructions are stored by a tank manager 84 into a set of 32K byte buffers called tanks 86 that are physically embodied in the DRAM 64 (see FIG. 1). When a tank 86 is full, the contents are passed to a CRIS display list decoder 88. The display list decoder 88 decodes the CRIS instructions into a set of marking commands (MX commands) that are passed to the mapper accelerator 42 via the MMX bus 48 (see FIG. 1).

The display list decoder 88 also decodes the printer command set PCS to generate reference control commands that are sent to a marking engine control module 90. The marking engine control module controls the marking engine 50 over a job communications control bus 52 (see FIG. 1). For the most part, the PCS commands are sent to the RIP prior to sending the page description commands.

The tank manager 84 also writes the decoded RIP instructions on a magnetic disk storage 92. The commands stored on the disk can then be accessed for making collated multiple copies for a particular job, or for recovering from a jam in the marking engine 50, where it may be necessary to repeat 3 or 4 previously generated pages that may exceed the size of the tank buffers 86.

Furthermore, in a color marking engine that marks one color at a time, the decoded CRIS commands are recovered from the tanks or the disk for each color component of the image, thereby avoiding the need to repeat the decoding process for each color thus increasing the efficiency of the marking engine.

Since most of the aspects of the RIP that are specific to a given marking engine are contained in the master processor unit 40, the RIP is easily customized for different marking engines simply by reprogramming the microcomputer in the master processing unit 40. The remainder of the RIP architecture is unaffected by this change. Due to this aspect of the architecture the RIP is easily customized for a variety of different marking engines having different features, and is readily adaptable to future generations of marking engines, thereby achieving manufacturing economics. The actual program for controlling the master processing unit is stored on disk 92, and is downloaded to the microcomputer upon start up.

The MPU 40 also includes a service manager module 94 that is connected to one of the RS-232 ports 68, and enables a microcomputer 96 to be connected by a service technician to the disk 92. Preferably the microcomputer 96 is a lap top portable computer that can be carried by the service technician. The service computer 96 can read any file stored on the disk and can execute diagnostic programs to exercise the RIP and diagnose malfunctions. The service computer 96 can also be used to load a new operating program for the master processing unit 40 to upgrade the control program as required.

The operation of the master processing unit will now be described with respect to decoding EKTASET print data. The decoding of HPGL proceeds in a similar manner and will not be described herein.

After the EKTASET decoder 82' receives a bucket of print instructions from the input manager, it begins processing the commands. The decoder enters a text parser acting on the input data as if it were text-data. Each of the instructions is checked to see if it is a control character or a printable character. Printable characters are decoded as CHAR-OUT CRIS commands in a display list that is sent to the tank manager 84. A cursor for keeping track of page location is advanced, and checked against the limits of the preset margins. If the character is a control character, the appropriate action is taken.

A special control character called the escape character is used to allow merging of text and graphic data in the same data stream. When the EKTASET decoder encounters an escape character, the next two characters of the job are assumed to make up the command ID of the escape command.

A command ID is formed by taking the low order nibble (4 bits) of the two characters that follow the escape character and combining them to form an 8-bit ID. This ID is used by the EKTASET decoder to access a table of function addresses.

The function indicated by the address is called and the appropriate action is taken. Status is then returned to the text parser so it can take appropriate action.

Many of the EKTASET commands have data associated with them. The data follows the command in a manner specified by the EKTASET language. The commands that expect data, remove it from the input stream and use it to perform their task.

When a job is done, a field within the message is set indicating that the bucket contains the last segment of the job.

The input manager 78 waits for the EKTASET decoder 82' to send it a bucket of display list data. Next the input manager 78 relays the bucket to the tank manager 84 and waits for a response from the tank manager 84 indicating that it has a new tank ready to receive a new segment of display list data. The input manager 78 in turn relays the empty bucket back to the EKTASET decoder and waits for that bucket to be filled by the EKTASET decoder.

If a segment that is transferred from a bucket to a tank is the last segment of the job, then the tank manager will delay sending an empty tank to the input manager 78 until the job has been completely processed and is safely delivered to the user.

Meanwhile, the CRIS display list decoder 88 has been waiting for the first segment of the job which the tank manager 84 will supply when it receives it from CRIS decoder 88. After receiving the initial segment, the CRIS display list decoder 88 waits for a configuration check message from the marking engine control software 90. If everything is all right, then page rasterization begins.

Control is passed to the rendering portion of the display list decoder 88. Display list commands are acted upon and mapper commands are sent to the mapper accelerator 92. If the current segment of display list data is emptied, a request is made of the tank manager for the next segment of the job. Display list processing continues until the end of page or job is reached.

The sequence control portion of the display list decoder 88 resumes control when an end of page or job is detected. The segment number and offset into the segment of each page are recorded so that a particular page can be recovered in case of a jam.

Communications take place between the display list decoder 88 and the marking engine control 90 at the beginning and end of each page. At the end of each page, the display list decoder 88 indicates to the marking engine control 90 that a page has been created in raster page memory (in OPU 44). The marking engine control 90 prepares the newly rasterized page for scan out to the marking engine print head. When another bank of page memory becomes available in OPU 44 (there are two banks), the marking engine control 90 tells the display list decoder 88 that page memory is ready to receive raster data. When these communications are complete, control is returned to the rendering portion of the display list decoder 88 and rasterization of the next page takes place.

TIME OUT CONDITION

The rip is designed to handle communications time outs with the host. Both EKTASET and PCS have a protocol for indicating the end of a job. If the job doesn't use either protocol, a time out condition is used to indicate the end of the job. If a time out occurs, the input manager 78 sets a field in the bucket message indicating that the bucket is the last in the job. In turn the message is relayed to the EKTASET decoder where this field is used to detect when a job is ended unexpectedly. There is a function that is called to extract data from the buckets which will return a status of End of File if the bucket is empty and the time out field is set in the bucket message.

HANDLING OF PCS COMMANDS

PCS is a finishing control protocol that may be used in conjunction with the EKTASET decoder. The EKTASET decoder treats a PCS command just like an EKTASET command. The preamble of a PCS command is esc>esc>[. To EKTASET this looks like an esc>[ command. Normally an EKTASET command is made up of two alphabetical characters. Since only the lower four bits of each character are used, it doesn't matter whether they are alphabetical. The PCS decoder 82''' returns a status back to the EKTASET decoder 81' indicating what kind of operations it performed. This allows the EKTASET decoder to keep track of what the PCS decoder did.

CREATION OF CHILD JOBS

PCS has commands that allow the creation of banner pages and trailer pages. These pages are treated separately from the body of the job. If a user asks for ten copies of a job that has banner and trailer pages, only the body pages of the job will be copied ten times. There will be only one copy of the banner and trailer. In this case, the job is split into three marking engine jobs. The banner pages form one job, the body pages form a second, and the trailer pages form the third.

CHUNK COLLATION

Chunk collation is a method of collating a job which is too big to fit entirely on the hard drive of the rip. The following is a description of what happens when a job that requires collation is too big to fit on the disk.

The previous description of how a job flows through the system applies with the exception of when the display list decoder 88 makes segment requests of the tank manager 84.

When a job is too big to fit on the disk 92, the tank manager 84 will return a warning to the display list decoder 88 that the segment that it requested will not fit on the disk without first deleting the previous segments of the job.

When the warning is encountered, the display list decoder 88 aborts the current page and returns status indicating that the disk is full to the sequence control portion of the display list decoder 88. The marking engine control 90 will be informed of this condition and the current raster page memory will be cleared.

The page and segment number of the last successfully rasterized page will be recorded since this page is the last one in the current chunk. The segments of the job that are stored on the disk 92 are the only segments from which collated copies can be made.

The sequence control portion of the display list decoder 88 will present the first segment of the current chunk to the rendering portion of the display list decoder 88 to begin rasterizing the second copy of the chunk. Rasterization of all pages up to and including the recorded page will be done. This process will be repeated until the required number of copies has been made. After the first chunk is completed, the next page to be rasterized is the page on which the disk full warning was issued. If a disk full warning is issued during the next tank, then the previous procedure is applied to the next chunk.

Mapper Accelerator (MX)

The MMX interface 48 and the Mapper Accelerator (MX) 42 will now be described in further detail with reference to FIGS. 5 and 6.

The MX Mapper/Accelerator 42 functions as a dedicated slave co-processor to the MPU 40 to provide a high speed data path to a full page buffer in the OPU 44. The Mapper accelerator 42 is a custom, command based, all-points-addressable, hardware accelerator with a local on-board font cache.

The Mapper Accelerator 42 executes a number of control and mapping commands that build a bitmap representation of a page image in a page buffer located in the OPU 44. Objects such as characters, vectors, filled areas and bitmapped images are rendered quickly at any pixel address within the 4M×16 maximum page address space. Objects can be textured (coarse patterned), clipped (windowed), and tinted (fine pattern resembling a halftone dot pattern) all without incurring a speed penalty during the mapping process. User defined rectangular regions can also be read from page memory and copied into font memory for subsequent use as "characters."

The Mapper Accelerator 42 is implemented as a high speed (10 MIPS) microprogrammed data mover that utilizes bit-slice technology to achieve a high degree of pipelining in the mapping process. The block diagram shown in FIG. 5 illustrates the primary data paths and major functional blocks of the Mapper Accelerator 42. The block diagram shown in FIG. 6 illustrates the architecture of the Mapper Accelerator 42.

The MX 42 has three (3) primary interfaces: a Command/Control interface (MMX 48), a system interface (MULTIBUS 46), and a dedicated interface to the OPU (OMX 54). Functionally, the MX 42 is partitioned into four (4) major sections: a Command Interpreter/Control Unit 100, a Local Memory 102 (PRAM, FRAM, and TRAM 102), a Page Address Generator 104, and a Data Conditioning Unit (RDC) 106. Each interface and major functional block is described below.

MMX Interface

MMX signal levels and timing specifications comply with the INTEL iSBX Standard, with the following exceptions.

DMA handshake lines are not implemented.

The "Reset" signal is not connected, since the MX 40 receives its initialization via the MULTIBUS 46.

Physically, the MMX interface 48 is implemented as an iSBX interface with a connector modification on the MPU 40 to accommodate a 50 conductor ribbon cable from the MPU 40 to the MX 42.

The MPX interface 48 (a modified INTEL iSBX interface) is a dedicated command port from the MPU 40 to the MX 42. It is a memory-mapped register oriented interface that allows the MPU to deal with the MX as a co-processing resource. It is organized as a set of eight (8) I/O addresses in MPU I/O address space and two (2) dedicated interrupt lines. The interface is comprised of four (4) 16-bit parameter/data registers, an 8-bit control register, an 8-bit status register and two (2) "clear interrupt" addresses. The I/O addresses are expressed as I/O port addresses for the MPU 40. In general, the iSBX addresses are determined by replacing the first 4 Hex digits with Don't Cares (e.g. CREG address=XXXX04). A full breakdown is shown in Table 1 below:

TABLE 1

| MMX Address | Access Mode | Function | Mnemonic |
| --- | --- | --- | --- |
| FE2004 | Write | Command Register/Alternate LSH Data Register | CREG |
| FE2000 | Write | MSH Data Register | XREG |
| FE2002 | Write | LSH Data Register | YREG |
| FE2006 | Write | Character Attributes Register | FREG |
| FE2008 | Write | MX Control Register | MXCR |
| FE2008 | Read | MX Status Register | MXSR |
| FE200A | Read | Clear Buffer Available Interrupt (No data returned) | CBAI |
| FE200C | Read | Clear Form Feed Ack. Interrupt (No data returned) | CFFA |

Interface to the MX 42 can generally be divided into Control/Status operations and Commands. control is performed by writes to the Control Register (MXCR) while status is read from the Status Register (MXSR).

All commands are issued via writes to the CREG, XREG, and YREG registers and result in direct execution of microcode sequences. A write to the Character Attributes Register (FREG) is treated as an extension to a specific command (MapChar). Interrupts generated by the MX 40 include execution of a Form Feed Command an indication that the "command buffer" is available. Clearing MMX interrupts is accomplished by reading either the CBAI or CFFA registers (see Table 1).

MX CONTROL/STATUS OPERATIONS:

Shown below in Table 2 is the format of the MXCR and MXSR registers and an explanation of each bit's function:

MPU control of MX interrupts is achieved by reading the CFFA and CBAI registers:

Clear Form Feed Ack: Allows the "Form Feed Acknowledge" interrupt (active high level) to be cleared under MPU control. This occurs when the MPU does a read of the CFFA register.

Clear Buffer Available: Allows the "Buffer Available" interrupt (active high level) to be cleared under MPU control. This occurs when the MPU does a read of the CBAI register.

MX COMMANDS:

The MX command interface utilizes the XREG, YREG, CREG, and FREG registers as a single level "command buffer," through which all parameters re-

TABLE 2

| Port/ Bit | D15 | ... | D8 | D7 | D6 | D5 | D4 | D3 | D2 | D1 | D0 |
|---|---|---|---|---|---|---|---|---|---|---|---|
| MXCR (Control) | X | ... | X | X | X | X | X | Reset MX=1 | X | X | Inh=1 ENA=0 |
| MXSR (Status) | X | ... | X | MX Inh=1 | MX E2 | MX E1 | MX E0 | MX OK | Off-line=1 | FF Ack=1 | MX Busy=1 |

MXCR BITS:

Reset MX: Active High (1) - allows the user to reset the MX board independently from other boards in the RIP. The MX will synchronize (if lost) by vectoring to microinstruction address 000 and then jump to the main command loop to await further commands. The condition is self clearing in hardware.

Inhibit/Enable-MX: Allows the MPU to send commands to the MX without actual MX execution of the commands (if inhibited). The Busy bit in the MXSR will remain in a cleared state independent of MMX command sequence transfers. The "inhibit" condition can only be toggled via MPU write to the MXCR. When inhibited, the "Buffer Available" interrupt (MINTR0) will remain in a stable state (i.e. no transitions will occur as commands are sent). Normal operation of the MX is achieved in the "enabled" state.

MXSR BITS:

MX Inhibited: Active High (1) - indicates that the board is currently inhibited from execution of MX commands.

MX E2: Most significant bit of 3-bit error code. Indicates board fault.
MX E1: Middle significant bit of 3-bit error code. Indicates board fault.
MX E0: Least significant bit of 3-bit error code. Indicates board fault.
MX OK: Indicates board health condition.
MX Offline: Active High (1) - indicates that the board can be accessed via MULTIBUS to read or write FRAM, TRAM OR PRAM.
Form Feed Ack: Active High (1) - indicates that a End of Page/Form command has been processed, implying termination of mapping activity for the current image.
MX Busy: Active High (1) - indicates that the most recently issued set of command parameters (X,Y,C) in the "command buffer" has not yet been processed by the MX.

MX INTERRUPTS

The MX 42 generates two (2) interrupts to the MPU 40. The Form Feed Acknowledge interrupt (MINTR1) is an active high, level triggered interrupt which goes active when the MX has executed an "end of Page/-Form" command. The Buffer Available interrupt (MINTR0) is an active high, level triggered interrupt which goes active when the MX clears the Busy bit—indicating that it had processed the most recently issued set of command parameters (i.e. x, y and/or C information).

quired for a given command must be passed. The X and Y registers are general purpose 16-bit registers for parameter passing. The C register doubles as a command register and a parameter/data register. The F register allows the MPU to specify information regarding character attributes for subsequent character mapping.

The MX Control Unit operates on a 5-bit command word allowing a total of 32 different commands to be implemented via bits C4–C0 of the CREG. Command formats for each MX command and notes on register usage are detailed in Appendix D. The general format of each register is shown below in Table 3:

CREG (COmmand Register):

| D15 | D14 | D13 | D12 | D11 | D10 | ... | | D0 |
|---|---|---|---|---|---|---|---|---|
| C4 | C3 | C2 | C1 | C0 | | ← additional command related information → | | |
| | | | | | | *** OR *** | | |
| MSB | | | | | ← Line Count, LS half of 32-bit slope, Bitmap Data, etc. → | | | LSB |

MX Command (C4–C0): Defines the MX operation to be executed (1 of 32). See Section 4.0 for a complete description.

XREG (X related information Register):

| D15 | ... | | D0 |
|---|---|---|---|
| MSB | ← related info., Word Count, MS half of 32-bit slope etc. → | | LSB |

-continued

YREG (Y related information Register):

| D15 | | | | | | | | | | | | | | | D0 |
|---|---|---|---|---|---|---|---|---|---|---|---|---|---|---|---|
| MSB | | | | | | ← Y related information → | | | | | | | | | LSB |

FREG (Font attribute information Register):

| D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|
| X | X | X | X | X | X | Spare | Mirr. Ena. | 180 Rot. | Char. Set | F5 | F4 | F3 | F2 | F1 | F0 |

| | |
|---|---|
| Mirror Enable: | Most significant character rotation mode bit. Defines mode to be used during subsequent character mapping operation. If set, the MX will decrement Y (instead of incrementing Y) during the basic character mapping process. See FIGS. 7, 8, 9, and 10 and TABLE 3 below for complete description. |
| 180 Rotate: | Least significant character rotation mode bit. Defines mode to be used during subsequent character mapping operations. If set, the MX will decrement X (instead of incrementing X) during the basic character mapping algorithm. The MX will also modify the shift value accordingly and perform a full end-to-end bit swap on each data word mapped. See FIGS. 7, 8, 9, and 10 and TABLE 3 below for complete description. |
| Character Set: | Defines format of PRAM for MX accesses during character mapping. PRAM can be organized as 64 fonts of 128 characters each (standard set) or 32 fonts of 256 characters each (international set). 0 - Standard Character set @ 128 characters 1 - International Character set @ 256 characters |
| Active Fonts (F5-F0): | Defines the currently active font (1 of 64) for subsequent character mapping operations. Note that if CharSet=1, F0 is ignored. Standard and International fonts can be intermixed in FRAM as long as all associated entries in PRAM fall on 256 word (512 byte) boundaries. In that case, the total number of fonts that could be referenced in PRAM would be 32. |

The possible character orientation modes are shown in Table 3 below.

TABLE 3

| Character Orientation | Mirror Enable Bit | 180 Rotate Bit |
|---|---|---|
| Standard | 0 | 0 |
| Mirror about Xi | 0 | 1 |
| Mirror about Yi | 1 | 0 |
| Full 180 about Xi, Yi | 1 | 1 |

Figure 7:
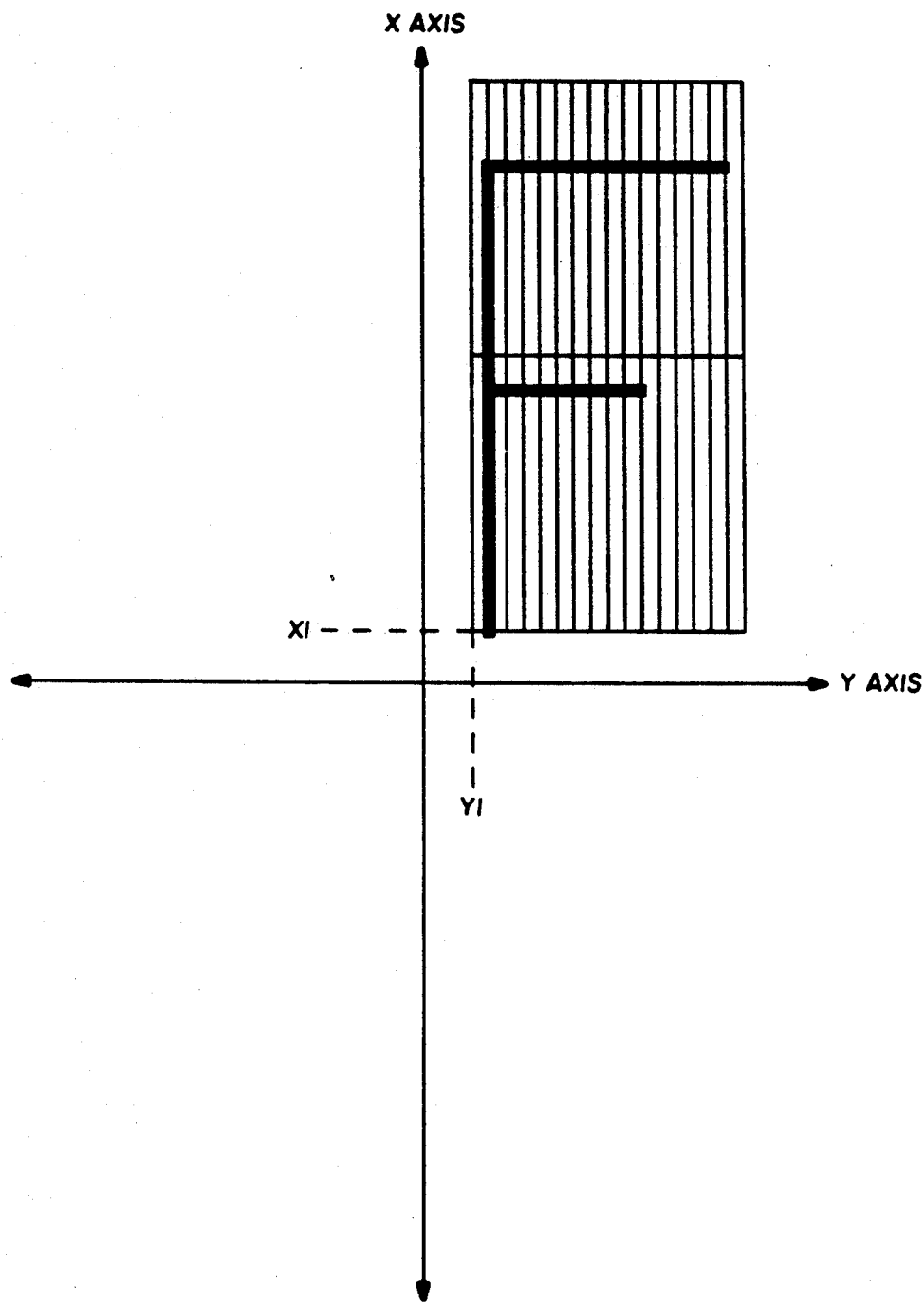
FIGS. 7-10 are diagrams useful in describing font rotation performed by the data conditioning unit shown in FIG. 5.

FIG. 7 illustrates a character that is mapped in standard orientation. The character is stored in FRAM as 32-16 bit words. Both the mirror enable and the 180° rotate bits are set to zero. The character is mapped from FRAM 102a to page memory in the OPU 44 by incrementing the X and Y addresses sent to the page memory in the OPU 44.

Figure 8:
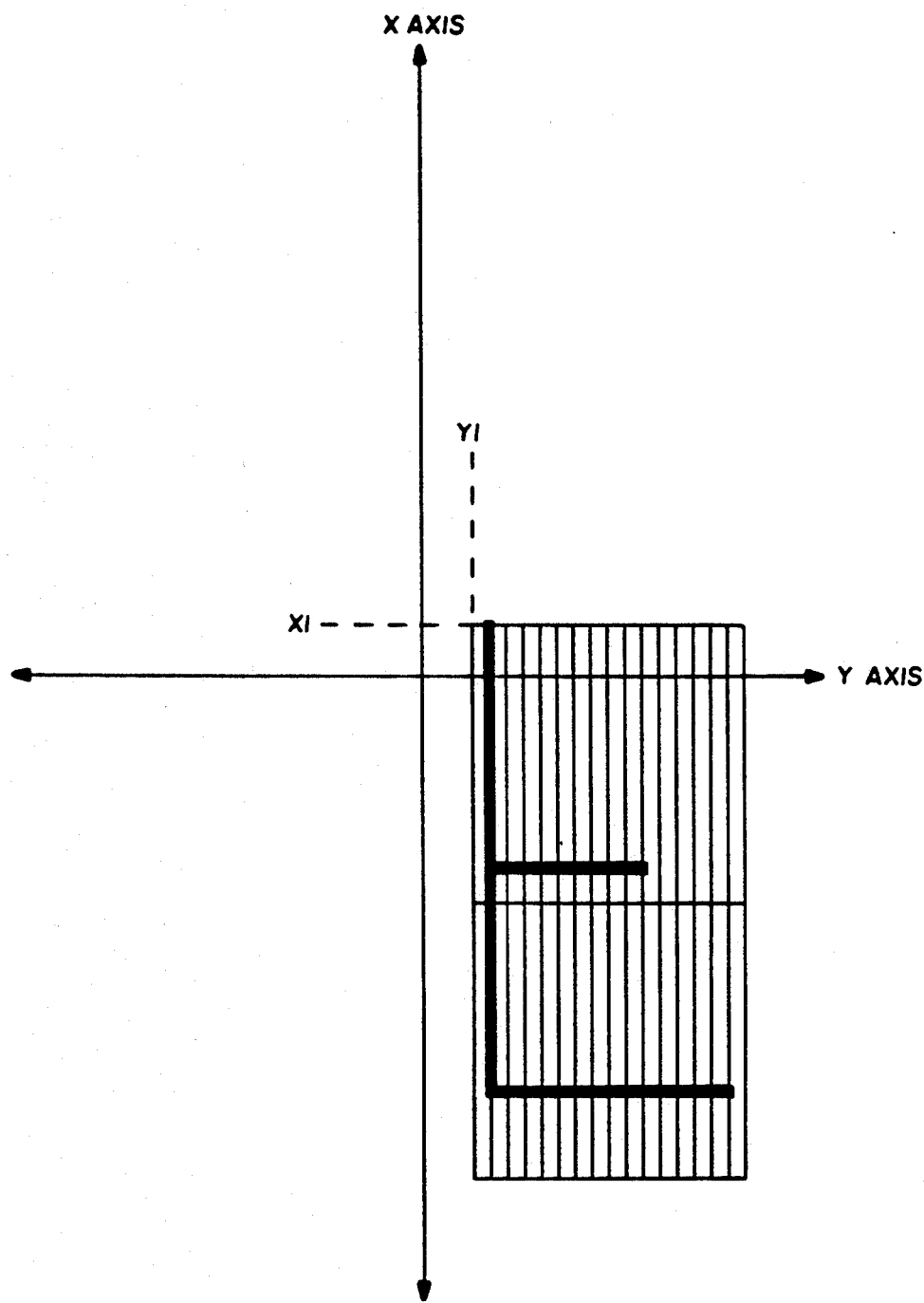

To rotate characters by 180° about the X axis as shown in FIG. 8, the 180° rotate bit is set. This causes the mapper accelerator 42 to decrement the x coordinate of the page memory address, modify the shift value, and perform a full end-to-end bit swap on each data word that is sent to the page memory.

Figure 9:
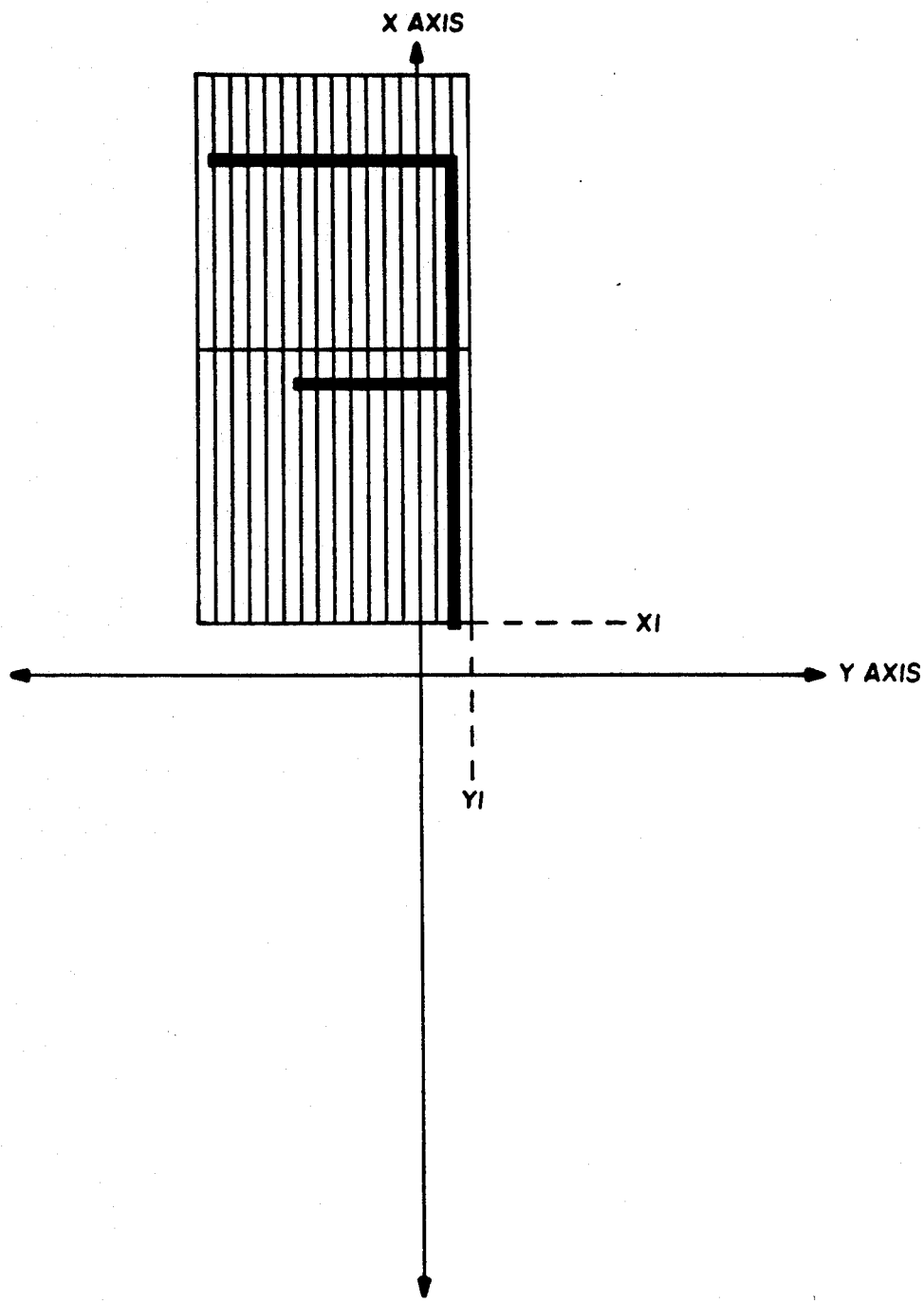

When the mirror enable bit is set, the mapper accelerator 42 rotates the character about the Y axis, as shown in FIG. 9, by decrementing the Y address to the page memory.

Figure 10:
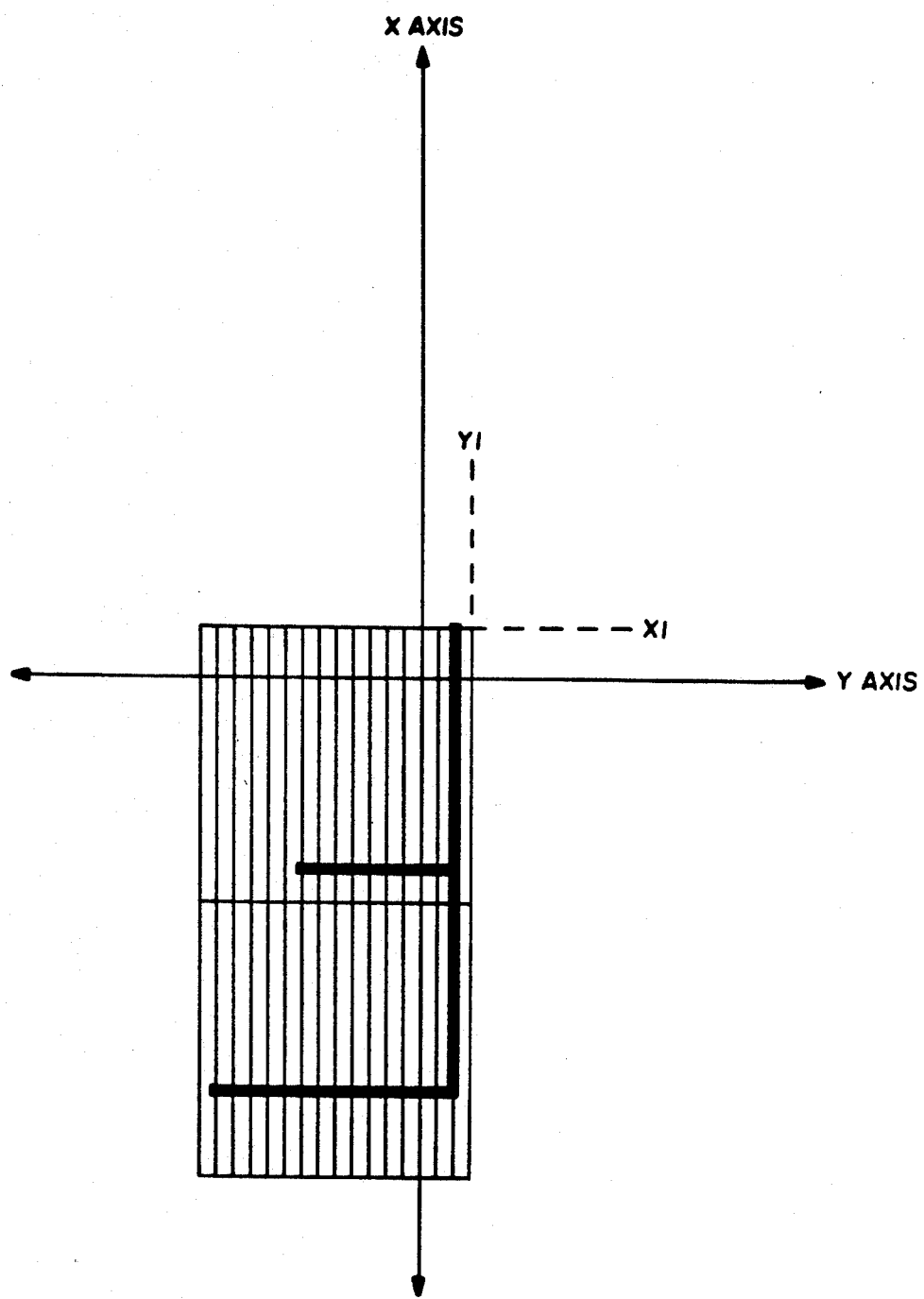

When both the mirror enable, and the 180° rotate bits are set, the character is rotated 180° about the origin, as shown in FIG. 10.

Figure 5:
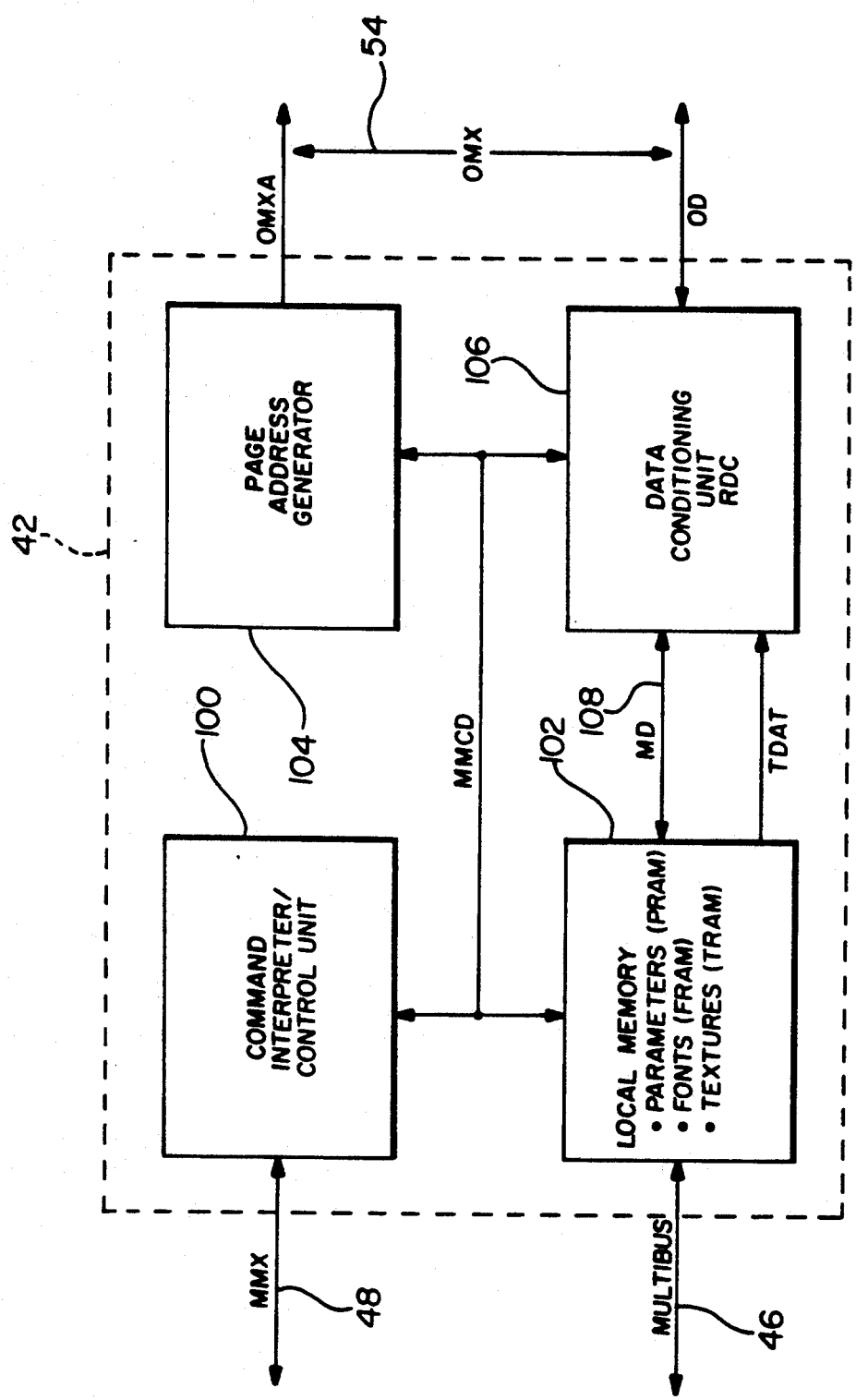
FIG. 5 is a functional block diagram of the mapper accelerator shown in FIG. 1.

Referring to FIG. 5, the command interpreter/control unit 100 receives commands from the MPU 40 via the MMX interface 48 and triggers execution of a corresponding microcode sequence of microinstructions. Each microroutine is tailored specifically toward execution of a specific setup, mapping or readback operation.

Command execution begins upon receipt of a particular set of command specific parameters. Each MX command defines a set of parameters to be sent to the MX in sequence via writes to the X, Y, and C registers.

The MX 42 is viewed as a memory slave to MULTIBUS 40, occupying three (3) distinct areas of MULTIBUS memory space. A detailed memory map is shown in Table 7 below.

MULTIBUS compliance level is as follows: Slave D16 M24. It should be noted that only 16-bit memory accesses are supported. DMA by a MULTIBUS master can occur into or out of MX memory 102.

The MX receives its RESET from the MULTIBUS INIT* signal.

There are no MULTIBUS interrupts used or monitored by the MX.

Figure 6:
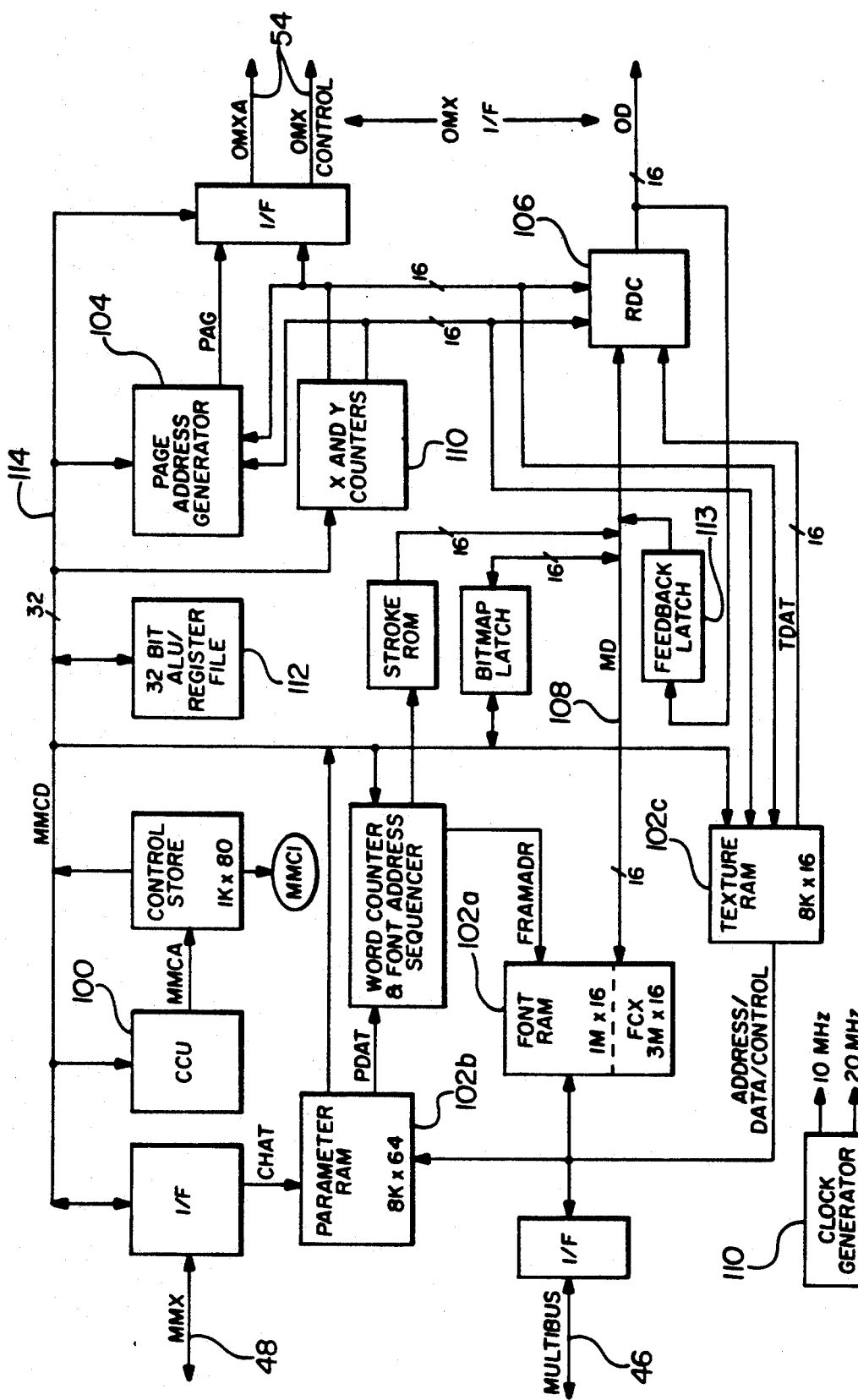
FIG. 6 is a block diagram showing the architecture of the mapper accelerator.

Local memory 102 consists of Font RAM (FRAM) (102a in FIG. 6), Parameter RAM (PRAM) (102b in FIG. 6), and Texture RAM (TRAM) (102c in FIG. 6). Each memory array is physically separate from the others and as such can be accessed by the MX Control Unit 100 in parallel. This architectural feature adds significantly to the mapping performance of the RIP. Each memory array is also dual ported to MULTIBUS for diagnostic testing, initialization and general read/write access by the MPU 40.

To access any of the arrays, the user issues a "Go Offline" command to the MX. This will take the board off-line for MPU access. Issuance of any other command over the MMX interface will bring the board back on-line for mapping use.

Figure 11:
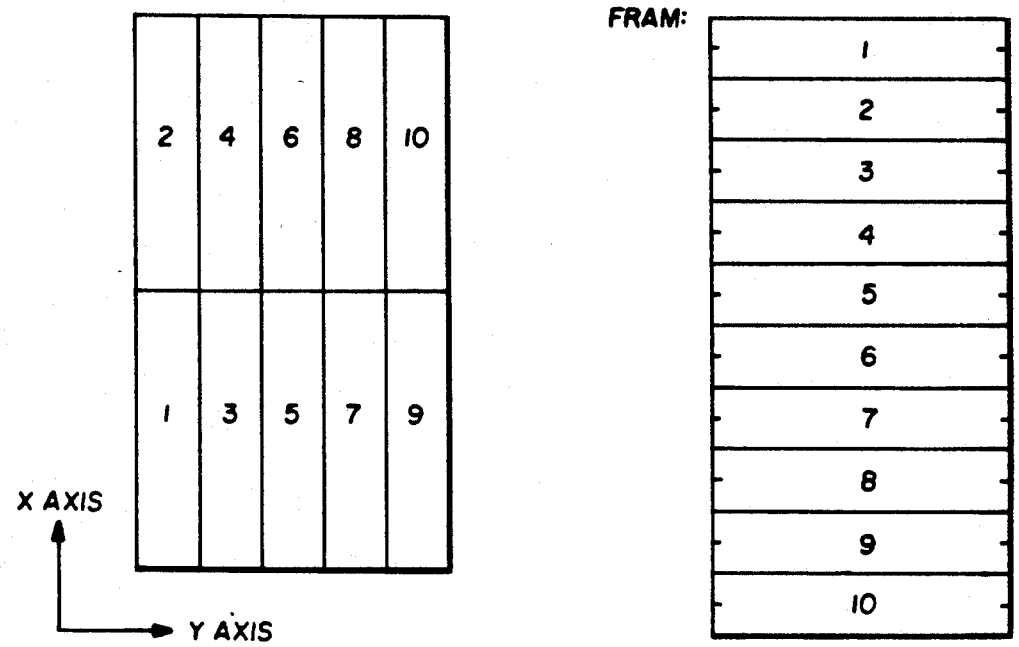
FIG. 11 is a diagram useful in describing the font storage in the font RAM shown in FIG. 6.

FRAM 102b is organized as 4M×16 memory. FRAM is intended to be used as a local cache for linearized character bitmaps to aid in the MX character mapping process. All character bitmaps are stored in a linearized fashion as shown in FIG. 11.

All words composing the first line of the bitmap, followed by all words of the second line, followed by all words of the third line, etc.).

Characters are stored in a reduced format as described in U.S. patent application Ser. No. 430,542 entitled "High Speed Character Generator" filed Nov. 2, 1989 by D. J. Statt, which is incorporated herein by reference.

Since the Font RAM (FRAM) 102a is a sizeable MULTIBUS memory resource, the MPU 40 is free to allocate it for other general purpose storage as it sees fit. FRAM must be tested and managed by the MPU. The MPU 40 has Read/Write access to FRAM when the MX 42 is offline. The MX 42 has Read/Write access to FRAM if the MX is online.

PARAMETER RAM 102b (PRAM) is organized as 32K×16 from the MULTIBUS side and 8K×64 from the MX side. It is dedicated for character parameter storage. PRAM organization is optimized to provide the MX parallel access to all three (3) parameters (Words/Line, Lines-1, and FRAM start address) within a single read operation. Access from the MX side of the 8K×64 array is as shown in Table 4 below:

TABLE 4

| A12 | A11 | A10 | A9 | A8 | A7 | A6 | A5 | A4 | A3 | A2 | A1 | A0 |
|-----|-----|-----|----|----|----|----|----|----|----|----|----|----|
| F5 | F4 | F3 | F2 | F1 | * | C6 | C5 | C4 | C3 | C2 | C1 | C0 |
| <--- Font # ---> | | | | | | | | | | | | |
| | | | | | | <--- Character code ---> (7 or 8-bit ASCII) | | | | | | |

*Note:
A7 = F0 when CharSet = 0
A7 = C7 when CharSet = 1

Access from the MULTIBUS side of the 32K×16 array is as shown in the memory map in table below. Format of parameter data in PRAM is shown in Table 5:

TABLE 5

| | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|
| (Lines-1) | <------------------------------ Lines-1 ------------------------------> | | | | | | | | | | | | | | | |
| (Words/Line) | <------------------------ Words/Line ------------------------> | | | | | | | | | | | | 0 | 0 | 0 | 0 |
| (FRAM Addr. LS) | 0 | <---------------------- FRAM Addr. 15 LSbits ----------------------> | | | | | | | | | | | | | | |
| (FRAM Addr. MS) | X | X | X | X | X | X | X | X | 0 | <-- FRAM Addr. 7 MSbits --> | | | | | | |

PRAM 102b must be tested and managed by the MPU 40. The MPU 40 has Read/Write access to PRAM 102b if the MX 42 is offline. The MX 42 Read access to PRAM 102b if the MX 42 is online.

TEXTURE RAM 102c (TRAM) is organized as 8K×16 from both the MX and MULTIBUS sides of the array. It is dedicated for storage of up to 32 textures or fill patterns that have been linearized for MX usage. Each texture is organized as a 64 pixel by 64 pixel tile stored in a linearized fashion as 256 sequential 16-bit words (identical to the way that a character bitmap is stored linearized within FRAM). The MX accesses individual words of a preselected texture during mapping operations based on current X and Y values. Addressing from the MX side of the array is as shown in Table 6 below:

TABLE 6

| A12 | A11 | A10 | A9 | A8 | A7 | A6 | A5 | A4 | A3 | A2 | A1 | A0 |
|-----|-----|-----|----|----|----|----|----|----|----|----|----|----|
| T4 | T3 | T2 | T1 | T0 | Y5 | Y4 | Y3 | Y2 | Y1 | Y0 | X5 | X4 |
| <--- Texture # ---> | | | | | <--------- Y ---------> | | | | | | <X> | |

TRAM 102b must be tested and managed by the MPU 40. The MPU 40 has Read/Write access to TRAM 102b if the MX 52 is offline. The MX 42 has Read access to TRAM 102b if the MX is online.

The MX data conditioning unit (RDC) 106 is a 1.5 micron standard cell (3800 gate equivalent) ASIC that provides an integrated implementation of a number of data manipulation functions. Data objects to be mapped to page memory can be shifted, mirrored, rotated, textured and clipped as well as logically combined with feedback data read back from page memory.

These operations are described in further detail in U.S. application Ser. No. 236,811 "Page Memory Control in a Raster Image Programmer" filed Aug. 26, 1988 by Statt el al. which is incorporated herein by reference.

The data conditioning unit RDC 106 functions under microprogram control within a 200 ns interval. The basic sequence of operations is described below:

1. Latch in a 16-bit data word from the MD bus 108 (e.g. font data, stroke data or bitmap data).

2. Shift the data word appropriately (0-15 bits as indicated by the least significant 4-bits of the desired X pixel coordinate). Store the 32-bit result in two separate 16-bit registers.

3. Produce a 16-bit mask word by comparing the current X and Y coordinate values from X, Y counters 110 to the predetermined upper and lower boundaries of the rectangular clipping window (X1, Y1 and X2, Y2).

4. Perform a logical AND of the shifted data (object), the clipping window mask data and the corresponding word (determined by current X and Y) of the preselected texture.

5. Mirror the above result in X, or in Y, or in both X and Y (180 degree rotate) if requested. This feature is available on character operations and affects the direction that the character is mapped into page memory as well (i.e. decreasing v.s. increasing X and Y).

6. Logically combine the previous result with data previously read back from page memory and stored in Feedback latch 113 (if requested). Logic modes provided are listed below:
New Data AND Feedback Data
New Data OR Feedback Data
New Data XOR Feedback Data New Data/AND Feedback Data
New Data/OR Feedback Data
New Data/XOR Feedback Data 7. Latch the final 16-bit result into the output register.

All data destined for page memory must pass through the RDC 106. In addition to the functions described above, the device performs a logical OR of previous data with next data for consecutive words mapped to page memory within the same scan line. This has a net effect of improving overall mapping efficiency by reducing the total number of writes to page memory for a given object. As an example, for an object that is n words high and m lines wide, the total number of writes to memory under this scheme would only be m(n+1).

Figure 12:
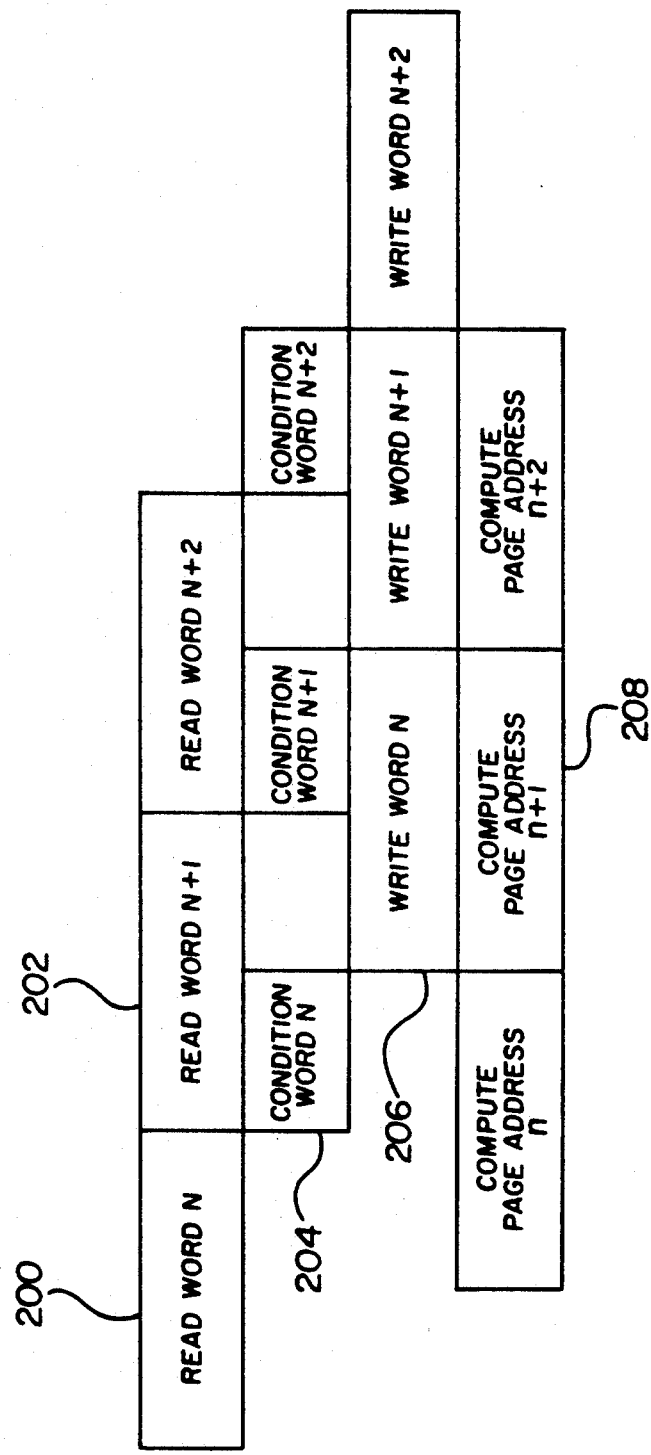
FIG. 12 is a diagram useful in describing the data pipeline in the mapper accelerator unit.

The data conditioning unit (RDC) 106 receives 16-bit words from the font memory 102 and delivers 16-bit words to the page memory in the output processing unit 44. Since the incoming words may be shifted to place the characters at any desired location in memory, the output word may include portions of two input words. To maintain the pipeline, the mapper accelerator 42 is always reading two words ahead of the output word. All words are 16-bits. The timing of the MX pipeline is shown schematically in FIG. 12. Word n is read into the RDC from the font memory (200). Next, word n+1 is read into the RDC (202). Word n is conditioned (204) (e.g. shifted) by selecting the 16-bits from words n and n+1 that will be in the output word. The output word n is then sent from the RDC to the OPU (206). While word n is being written to the OPU, the page address for word n+1 is computed (208). The pipeline then continues along the line, outputting a word each time a new word is read into the RDC.

The RDC chip operates on a 10 MHz clock synchronized with microprogram execution.

The MX page address generator 104 is a dedicated hardware unit whose sole purpose is to compute a 22-bit address into OPU 44 page memory over the OMX 54 interface every time an access occurs. The page address generator 104 operates in parallel with the data conditioning unit 106 so that maximum mapping efficiency can be attained. By allowing the user to select any arbitrary page height (via the "Set Page Height" MMX command), OPU page memory can be organized in a virtual page fashion to allow efficient OPU scan out. The page height, current X and current Y is then used by the page address generator to compute the current page address as follows:

$$PA = (XMAX)(Y) + X/16$$

Where:
XMAX = page height (in Words)
Y = pixel coordinate in Y direction
X/16 = word coordinate in X direction The page address is computed under microcode control using a 16×16 Multiplier/Accumulator chip to produce a page address every 600 ns.

The OMX interface 54 is a dedicated data path over which the MX accesses OPU page memory. It is composed of a 16-bit bidirectional data bus, a 22-bit address bus, three (3) control lines for write and read access, a color control bus and a 20 MHz clock for synchronized MX/OPU operation.

The OMX interface may be used in either an asynchronous (with ACK) or synchronous mode. Any address in the "ideal OPU page memory space" may be written to or read from over this interface at a rate of a single 16-bit word access every 300 ns in asynchronous mode or 600 ns in synchronous mode. Asyncronous mode requires that the ACK signal be monitored to allow refresh to occur without contention. Synchronous mode assures that refreshes occur transparently to the mapping process.

Color control during mapping operations involves the tint generator located in OPU 44 described below. Color plane (1 of 4), color mapping mode (Serial v.s. Parallel) and color level (Tint) are all setup via execution of the Set Color/Tint command issued over the MMX interface.

The "maximum OPU page memory space" is 4M×16. The tint generator is located at the top 512 words of the 4M×16 ideal page.

The MX 42 provides a 20 MHz clock 110 synchronized to the mapping process for OPU DRAM control and scan out operation.

Font RAM (FRAM) 102a is the local font bitmap memory cache in the RIP. Linearized bitmap representations of each character of a given font are stored in FRAM sequentially in order by ASCII code.

MX commands can be divided into four categories: Diagnostic commands, Setup commands, Mapping commands, and Readback commands. All commands involve transfer of information over the MMX interface 48 via writes to the X, Y, and C registers. A total of 32 unique commands can be implemented.

Each command requires transmission of one or more "steps." Each step, at a minimum involves an MPU write to the CREG, which in turn generates a MX BUSY flag. The MX 42 interprets this as a COMMAND PENDING flag which indicates that pertinent information for that step or command is present in the XREG, YREG, and CREG. Because a write to the CREG initiates MX execution of that step, the XREG and YREG writes must occur prior to the CREG write for a given step. Once the MX has consumed or processed the information, it will clear the MX BUSY bit indicating to the MPU 40 that new information for the next step of command can be loaded into the XREG, YREG, and CREG. Each command, its format and step sequence and a brief explanation of its usage is described in Appendix D.

The MX 40 operates on an 80-bit micro-instruction.

The MX uses two 29C101 16-bit ALU/Register slices to form a 32-bit arithmetic and logic unit ALU 112. A total of 16 registers are available for storage. The ALU 112 can access other registers and functions on the board via the 32-bit MMC bus 114.

OUTPUT PROCESSOR UNIT (OPU)

Figure 13:
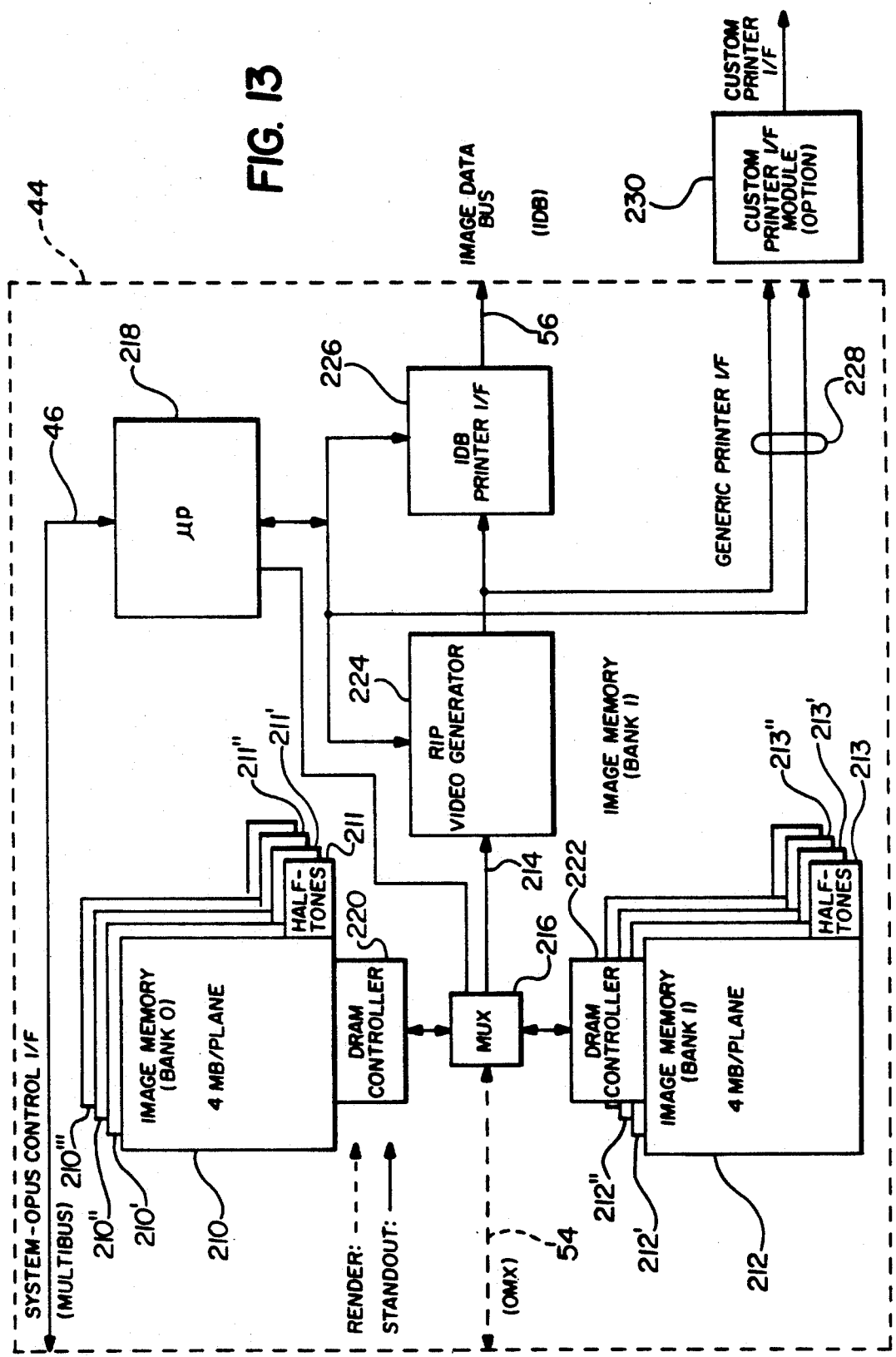
FIG. 13 is a block diagram of the output processor unit shown in FIG. 1.

Referring to FIG. 13, the output processor unit 44 will be described in further detail. The output processor unit 44 includes a pair of 4M byte DRAM page memories 210 and 212 and associated tint memories 211 and 213. The page memories 210 and 212 are connected to the OMX bus 54 and an output data bus 214 via a multiplexer 216, such that one of the page memories can be written into while the other is being read out of. This is known in the art as a doubled buffer or ping-pong memory. The output processor unit is controlled by a microcontroller 218 that is connected to the system control bus 46 and controls the overall operation of the output processor unit. Each image memory 210, 212 is controlled by a DRAM controller 220, 222 respectively that controls writing into and reading out of the memories in a conventional fashion. The output processor unit also includes a RIP video generator 224 and an IDB printer interface 226. The IDB printer interface 226 is a simple 16-bit interface capable of transferring a page bitmap to a marking engine, one 16-bit word at a time via handshakes with the marking engine.

A generic printer interface 228 is also provided. The generic printer interface 228 is merely a plug to the 16-bit output words from the RIP video generator 224, and an interface to the microcontroller 218. If the marking engine has special requirements, such as serial output, a custom interface module 230 can be provided on the generic interface. The custom interface module 230 contains, for example, a buffer for converting the bit stream from 16-bit parallel to serial, as is known in the prior art.

Figure 14:
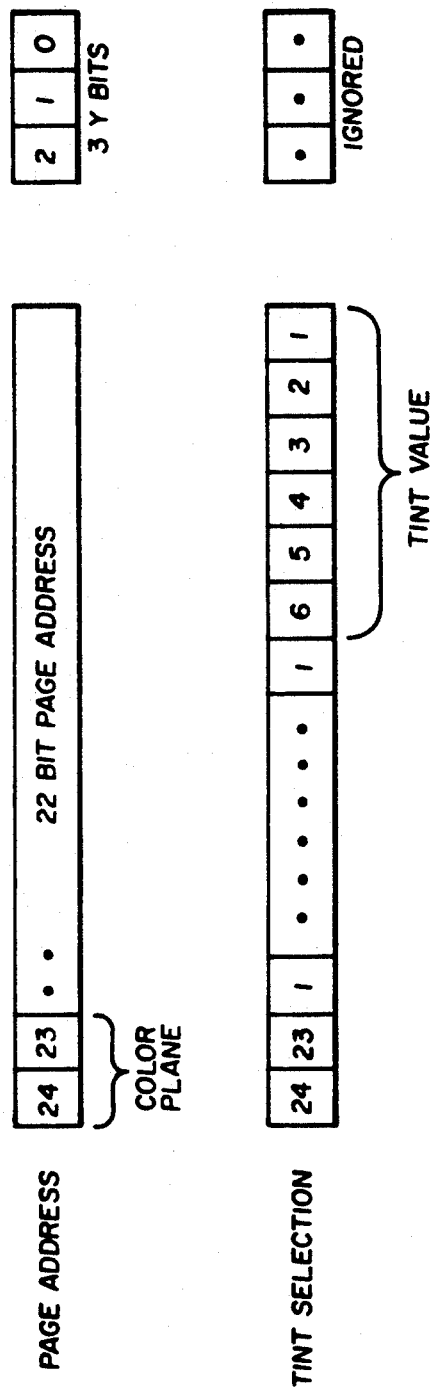
FIG. 14 is a diagram useful in describing the format of the words employed to address the tint and page memories in the output processor.
Figure 15:
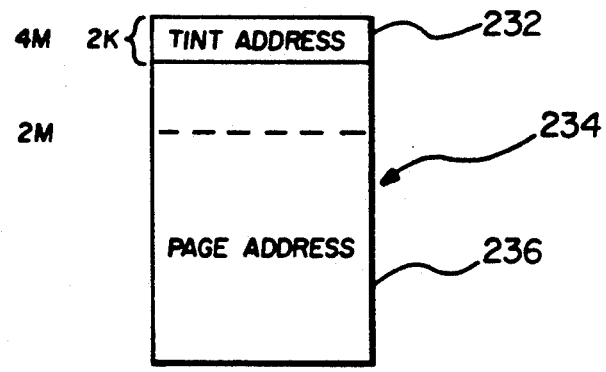
FIG. 15 is a diagram illustrating the address space for the page and tint addresses in the output processor.

The page and tint memories will now be described in more detail with reference to FIGS. 14, 15, and 16. The OMXA portion of the OMX interface is a 27-bit parallel interface. As shown in FIG. 14, the 27 bits can be used to address the page memory, or to select a tint pattern in the tint memory. As shown in FIG. 15 the tint patterns are addressed as the upper 512 words (232) of a 4 mega word address space (234). The page memory is addressed as the lower 2 mega words (236) in the address space. Thus, as shown in FIG. 14, the tint selection address contains 1's in bits 7–22. This condition is sensed by the DRAM controller to distinguish between a page memory address and a tint selection command.

Figure 16:
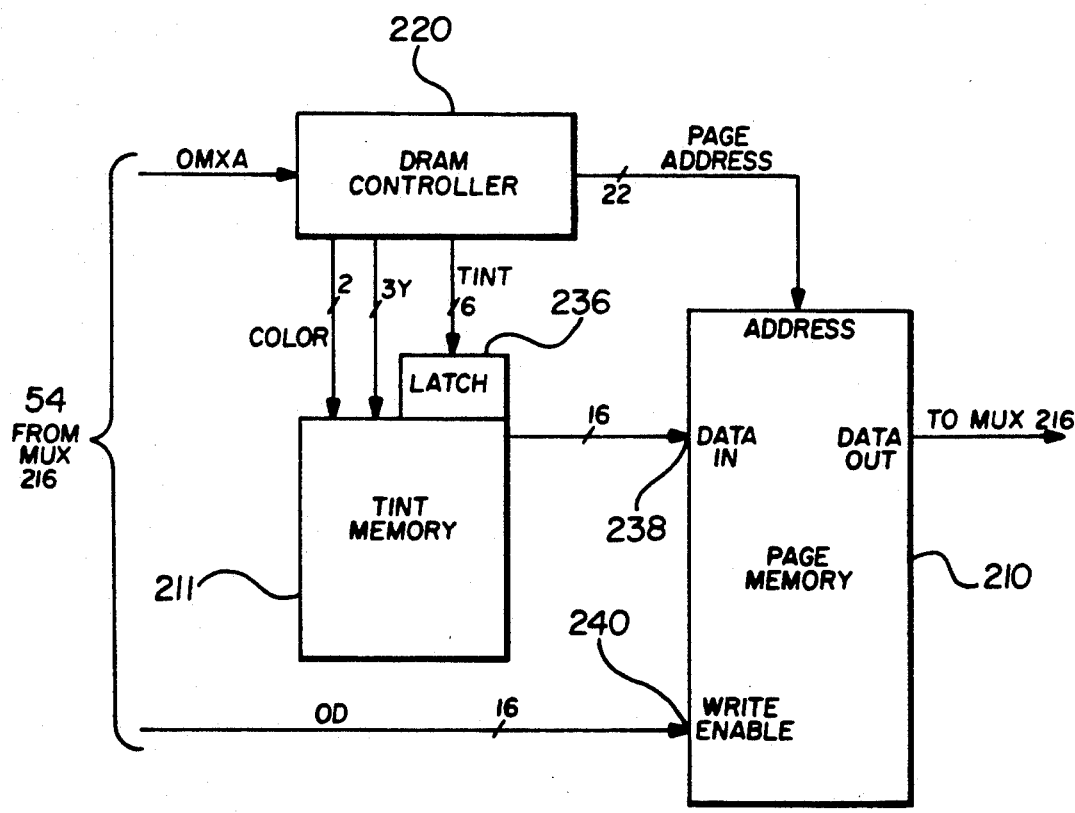
FIG. 16 is a block diagram useful in describing the tint memory and page memory addressing scheme in the output processor.

Referring to FIG. 16, the DRAM controller 220 receives the 27-bit input on the OMXA portion of the OMX interface 54 from multiplexer 216 and interprets the command as either a page memory address or a tint selection command. If the data is a page memory address, the DRAM controller 220 applies the 22-bit page address to the address input of the page memory 210. If the data on the OMXA line is interpreted as a tint selection command, the DRAM controller applies the lower 6-bits of the data to a latch 236 at the address input of the tint memory 211. The DRAM controller also applies bits 23 and 24 to the tint memory 211 to select a color plane, in the event that a color marking engine is being driven, and the lower 3-bits of the Y address to select an appropriate 16-bit tint word from the selected tint pattern each time a page address is sent to page memory. The tint patterns are applied to the data input 238 of page memory 210 as described in U.S. patent application Ser. No. 236,811 cited above.

A 16-bit character word from the RDC 106 (see FIG. 6) is applied on the OD portion of the OMX bus 54 to a write enable input 240 of the page memory 210. The effect is to apply the tint patterns only to the active bits in the characters. The IRP may also be operated to perform halftoning of a continuous color image in the manner described in U.S. patent application Ser. No. 414,501 entitled Page Memory Control in a Raster Image Processor Employed for Digital Halftoning filed Sep. 29, 1989 by Statt, which is incorporated herein by reference.

For driving a color marking engine the RIP can be operated either in a serial mode in which color planes are generated in the page memory in succession and sent to the marking engine, or a parallel mode in which all color planes are generated at one time in a plurality of page memories. In the parallel mode, the output processor is configured to contain a plurality of color plane memories and tint memories shown as 210', 210", etc. in FIG. 13. Each page memory is associated with its own tint memory. In operation, the tint pattern for each color plane is latched, then the page address and character data is sent to all of the page memories simultaneously.

Figure 17:
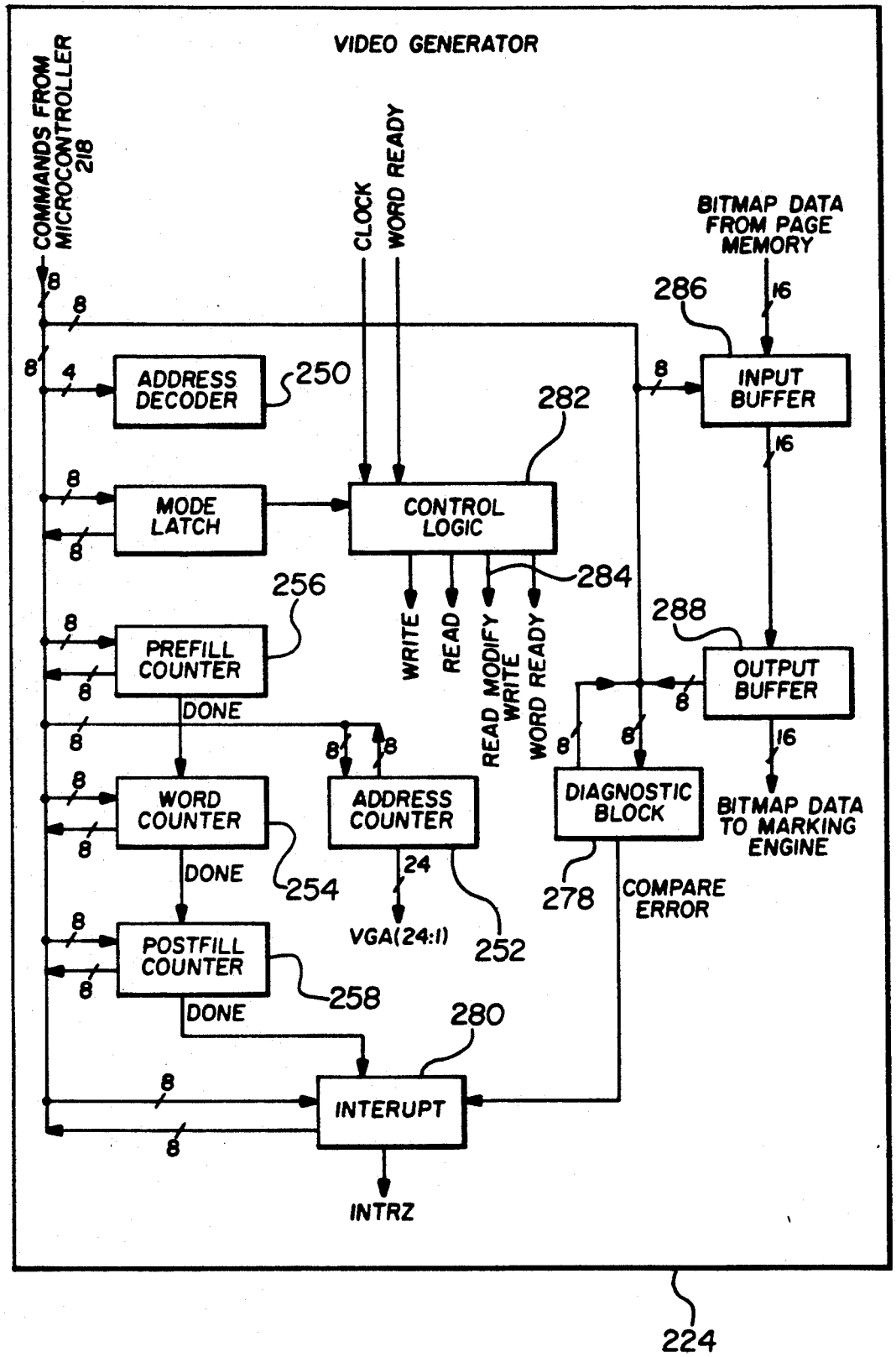
FIG. 17 is a block diagram showing the video generator in the output processor.

Turning now to FIG. 17, the RIP video generator RVG 224 will be described in more detail. The RVG 224 receives commands from the microcontroller 218 and reads out bitmap data from the page memories one line at a time.

The RVG 224 includes an address decoder 250 that gives the microcontroller 218 the ability to read or write control commands to the various control blocks in the RVG. One of the control blocks is an address counter 252. The address counter 252 is loaded by the microcontroller 218 through the address decoder 250 with the page memory address of the starting line in page memory for reading out to the marking engine. A word counter 254 keeps track of the number of words in a line that have been transferred to the marking engine that comprise actual image data. A prefill counter 256 is loaded with the number of words of blank space at the leading edge of a line in an image. The prefill counter 256 is decremented each time a blank word is sent to the marking engine until the count has reached zero at which point a done signal is generated. A postfill counter 258 is loaded with the number of words of blank spaces at the trailing edge of a line in the image, and operates similar to the prefill counter. The RVG 224 can also provide full blank lines before an image (line prefill) and full blank lines after the image (line postfill). The use of word pre and post fill, and line pre and port fill allows the RVG 224 to provide borders around the image.

Figure 18:
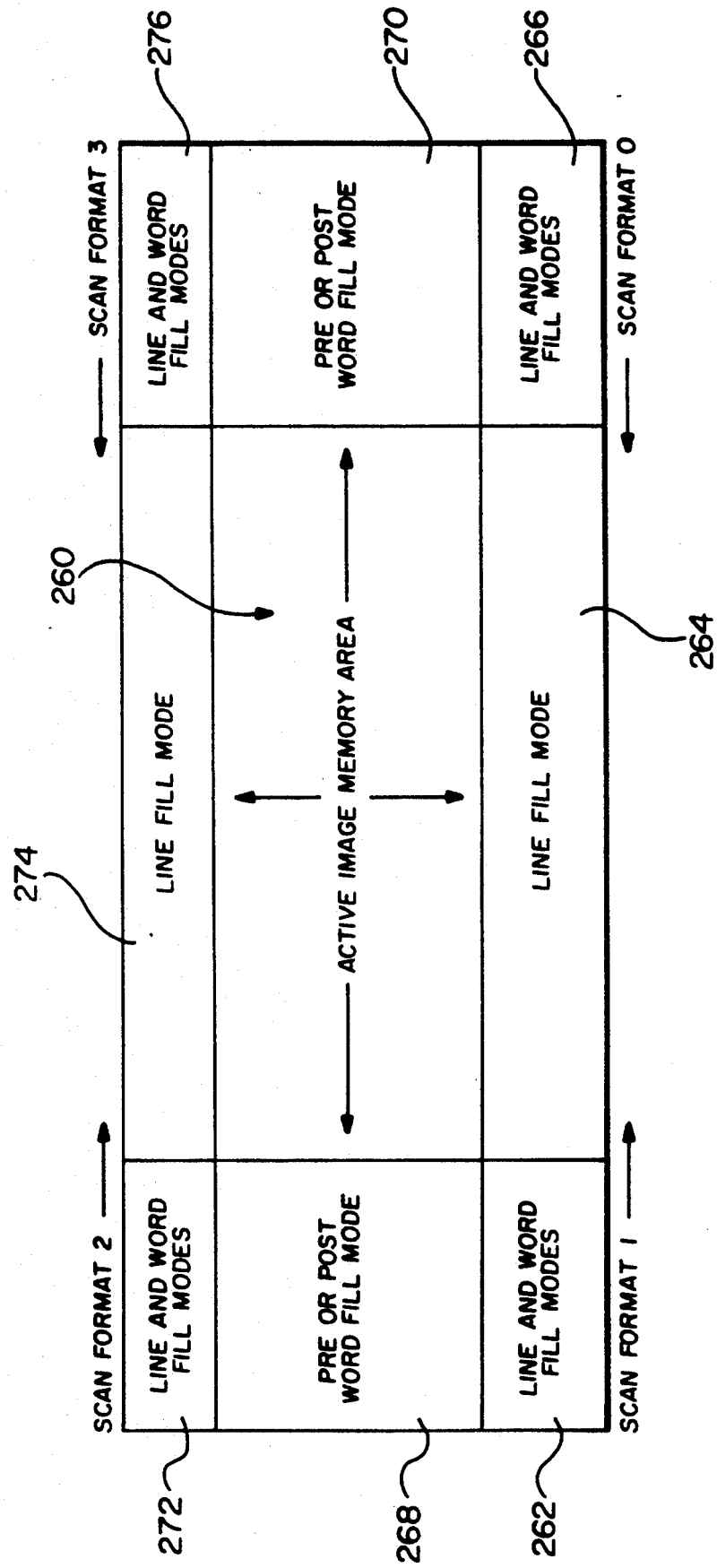
FIG. 18 is a diagram useful in describing the readout formats provided by the output processor.

The RVG 224 can be commanded by the microcontroller 218 (see FIG. 13) to read the image out of memory from any corner of the image top to bottom or bottom to top. FIG. 18 is a schematic diagram illustrating the scan formats, and use of pre and post word and line fills to provide margins around an image. As shown in FIG. 18, the image from memory is reproduced by the marking engine in an active image area 260. In scan format 1, the image is read out, starting from the lower left-hand corner. Pre-line and word fill provide a word border portion 262 at the lower left corner of the image. Pre line fill provides a border portion 264 directly below the image, and post line and word fill provides a border portion 266 at the lower right-hand corner of the image. A border portion 268 left of the image area 260 is provided by preword fill, and a border portion 270 to the right of the image area 260 is provided by post word fill. A border portion 272 to the upper left of the image is provided by post line and preword fill; a portion 274 above the image area 260 is provided by postline fill; and a portion 276 is provided by post line and post word fill. The borders are similarly provided for other scan formats (0,2, and 3) by appropriate use of the pre and post line and word fills.

Returning to FIG. 17, the RVG 224 includes a diagnostic block 278 that can be enabled to perform diagnostics on the contents of the page memories. In the diagnostic mode, a known pattern is loaded into the page memories and when readout via the RVG, the readout pattern is compared with the known pattern in the diagnostic block 278. If a comparison error is detected, an error message is sent to an interrupt block 280 that signals the microcontroller 218 (see FIG. 13). Similarly, an interrupt is generated in the normal readout mode and sent to the microcontroller via the interrupt block 280 whenever the post fill counter completes a line with the last post fill word in the line. This occurs when the pre fill is done, the word counter is done, and the post fill word counter is done. The interrupt is also generated when the post fill counter completes the last post fill line in an image.

The RVG 218 includes a status register to indicate why the interrupt was generated, i.e. either diagnostic, post fill word or post fill line. The RVG 224 includes a control logic block 282 that has a control branch allowing the microcontroller to setup the types of scan format modes, and what type of request to generate to page memory. The control logic block 282 can read memory destructively or nondestructively. Typically, the page memory is readout destructively so that as a word is read out, it is replaced by all zero's, thereby leaving an empty memory to receive the next image. This is a read modify write 284 type of operation. The control logic block 282 receives control signals from the microcontroller 218 and issues read and write signals to the page memories through the MUX 216. When the control logic 282 receives a word ready signal from the marking engine interface, it prefetches the next word from memory via input buffer 286 and simultaneously causes the previous word that has been latched into the output buffer 288 to be sent to the marking engine interface. When the new word is received from the memory, the control logic 282 indicates that it has another word ready by outputting a word ready control signal to the marking engine interface. Accompanying the read and write signals from the control logic 282 are page address signals from the address counter 252.

Figure 19:
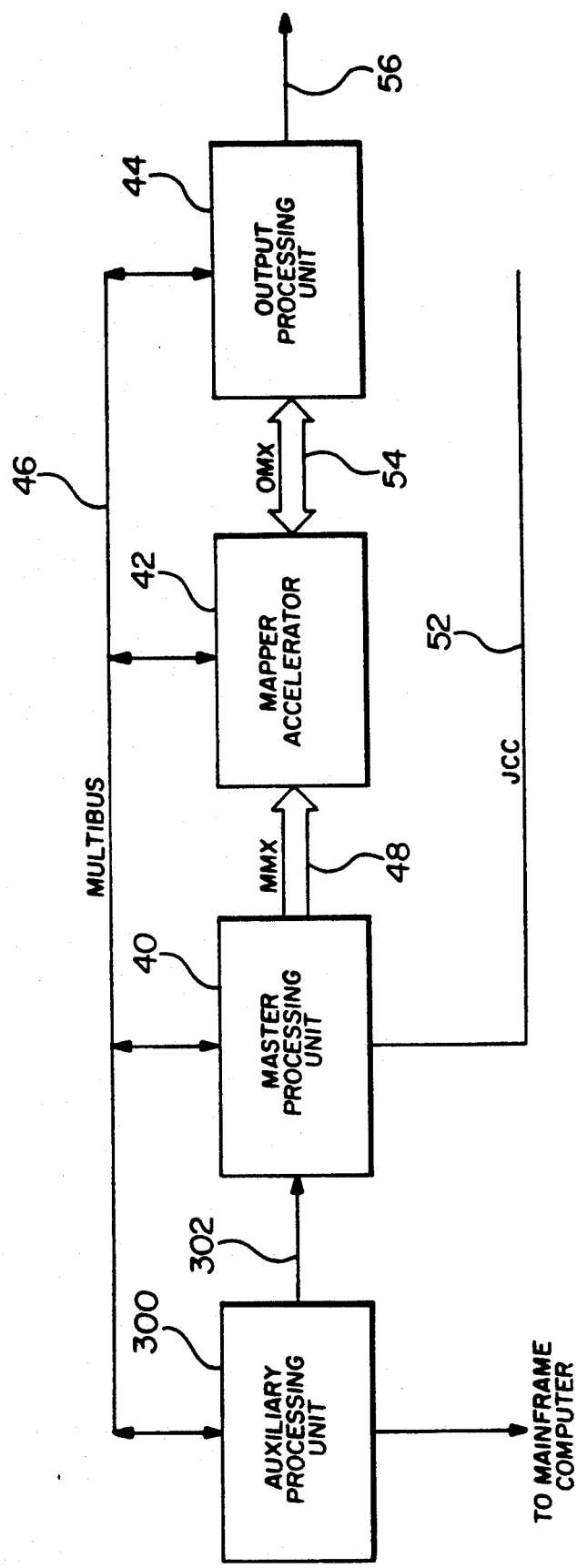
FIG. 19 is a block diagram useful in describing an alternative embodiment of the present invention, further including an auxiliary processing unit.

The raster image processor according to the present invention is easily expanded to include other functions, by adding more units to the MULTIBUS. An example of such an extension is shown in FIG. 19, where an auxiliary processing unit 300 is added to the MULTIBUS. The auxiliary processing unit is another microprocessor that provides the computing power to handle tasks such as interpreting or decoding the POSTSCRIPT TM Adobe language, and interfacing to a mainframe computer. POSTSCRIPT TM commands from a host mainframe computer are translated by the auxiliary processing unit to print data commands, for example the CRIS commands described above. The print data commands are supplied to the master processing unit 40 via the MULTUBUS.

Industrial Applicability and Advantages

The Raster Image Processor according to the present invention is useful in all points addressable printers. The RIP is advantageous in that it provides an efficient high speed RIP that is easily modified for different printer configurations, and readily expandable to provide increased capability.

APPENDIX A     Copyright Eastman Kodak Company 1990

CRIS Commands

Function within File:

```
Void OutputChar( position, char_code )
Void cris_enable_clipping( ClipFlag )
void cris_mach_init()
void cris_set_cap( line_cap )
void cris_set_font( font_id )
void cris_set_joint( line_joint )
void cris_set_limit( limit )
void cris_set_width( line_beg )
void cris_state_machine( condition )
void exta_circle_fill ( center,radius,theta_start_
                        theta_end,fill_type )
void ekta_circle_draw ( center,radius,theta_start,
                        theta_end )
void ekta_image( position, height, width )
void ekta_triangle_fill( p1, p2, p3 )
void ekta_thin_vec( p1, p2 )
void ekta_quad_fill( p1, p2, p3, p4 )
void ekta_traj_fill( traj_ptr )
void hpgl_traj_fill( count, traj_ptr )
void ekta_set_clip_boundary( p1_ptr, p2_ptr )
void ekta_set_fill_pattern( pattern_id )
void ekta_set_screen_id( screen_id )
```

```
    void end_of_job()
    void end page()
    void send_iris_bucket()
    void send_start_job( job_setup_ptr )
    void set_color_model(color_model)
    void set_font_xform( font_matrix_ptr )
    void set_foreground_color(count, intensity)
    void start_Page( x_scale, y_scale, max_dimension)
```
APPENDIX B

EKTASET

The EKTASET page description language is specifically designed for fast execution on printers, and is unique in its form handling capabilities.

EKTASET is based on the 7-bit ASCII protocol. It employs the escape character to identify an EKTASET command. When an escape character is encountered, the EKTASET command processor is invoked to handle command processing specifics. All other characters in the 7-bit ASCII protocol are interpreted directly, as they are defined. Printable ASCII characters are automatically placed on the output page.

All EKTASET commands consist of a three character sequence. The first character of the sequence is always the ASCII escape character. The escape character acts as a trigger to indicate that an EKTASET command follows. The remaining characters serve to uniquely identify a specific command. Specific parameters are then included for some commands.

By using the escape character as the trigger to EKTASET processing, all other characters defined within 7-bit ASCII retain their defined meanings. As each character in a job is processed, if it is not an escape character, it is passed on to be processed to the output page. EKTASET operates in ASCII Print Mode as a default state as a result of this feature. No commands are required to print ASCII text onto an output page.

ASCII Print Mode provides compatibility with many host-printer relationships established today. An EKTASET decoder accepts and prints ASCII jobs with no EKTASET control command overhead required.

For enhanced printing of an ASCII job, or for specific changes from the installed printer defaults, EKTASET provides a comprehensive, non-extensible set of commands to alter the printing environment. These features include both bitmap and vector graphics as well as control over the governing parameters affecting both typesetting and graphics operations.

The EKTASET commands are listed in Table 1, and selected examples are described in further detail below.

TABLE 1

DOCUMENT CONTROL

HE - HEader

EH - End Header

ID - IDentification

DE - DEfine

ED - Expand Definition

PAGE RENDERING - INHERENT SET

| GENERAL | TEXT | GRAPHICS |
|---|---|---|
| PF--Parameter Format | DC--Decimal Character | DA--Draw Absolute |
| UN--UNits | DT--Decimal Tab | DI--Draw Incremental |
| AS--ASsign | EK--End sub/supersKript | LA--Line Absolute |
| CO--COmment | EU--End Underline | LI--Line Incremental |
| EC--End Comment | FO--FOnt selection | LJ--Line Joints |
| CF--Color Format | HC--Horizontal tab Clear | LK--Line Kaps |
| GS--Gradation Screen | HM--Horizontal Margin | LW--Line Width |
| FL--Fidelity Level | HT--Horizontal Tab set | ML--Mitre Limit |
| PB--Pick Background | JC--Justify Center | OT--Opaque/Transparent |
| PC--Pick Color | JR--Justify Right | PN--PatterN |
| ON--OrientatioN | LS--Line Spacing | Path Operations |
| OR--ORigin | NS--uNderline Single | SP--Start Path |
| TO-Text Orientation | SB--SuBscript | JP--Join Path |
| PO--POsition (at XY) | SL--Spacing inter-Letter | EP--End Path |
| IX--Increment X | SU--SUperscript | AP--Append Path |
| IY--Increment Y | SW--Space Width | DP--Draw Path |
| WI--WIndow | VC--Vertical tab Clear | FP--Fill Path |
|  | VM--Vertical Margin | Draw Path/Fill Path Sequencing |
|  | VI--Vertical Tab set |  |

PAGE RENDERING – EXTENDED SET
GENERAL

| | |
|---|---|
| AB--Define Bitmap | Form Operations |
| FF--Flip Flop | DF--Define Form |
| RT--RoTation | FK--Form Komplete |
| SC--SCale | GF--Global Form |
| TR--TRanslation | MF--Main/Form transfer |
| UB--Use Bitmap | UF--Use Form |

| TEXT | GRAPHICS |
|---|---|
| AW--Angled Writing (Primary Adv). | AA--Arc Absolute |
| EL--End highLighting | AI--Arc Incremental |
| FA--Font Angle (Obliquity) | CA--Circle Absolute |
| GM--Galley Mode | CI--Circle Incremental |
| HB--Horizontal (margin) Begin | CK--ClocKwise |
| HL--HighLighting | CT--Curve Tolerance |
| HN--Horizontal (margin) eNd | EA--Ellipse Absolute |
| JF--Justify Fully | EI--Ellipse Incremental |
| ME--Margin Effector | LT--Line Type |
| MP--Move Primary | FI--Fill Rectangle Incremental |
| MS--Move Secondary | FX--Fill Rectangle Abs. (eXact) |
| ND--uNderline Double | OI--Fill Circle Incremental |
| VB--Vertical (margin) Begin | OX--Fill Circle Absolute (eXact) |
| VE--Vertical (margin) Effector | RA--Rectangle Absolute |
| VN--Vertical (margin) eNd | RI--Rectangle Incremental |
| VW--Vertical Writing | |

A Job Header supports pre-job processing steps. Processing of the Job Header occurs before the job is executed. Major preparation functions include loading of fonts and other objects to directly accessible memory, and screening of job specific processing conditions. The purpose of performing these functions on a pre-job level is to ensure that processing of the job's page level content can occur at maximum speed.

The job header will be the first entity encountered in a job. The header is identified by means of two EKTASET commands. The beginning of the job header is identified with the ~HE - HEader command. The end of the job header is identified with the ~EH - End Header command. All information contained between the ~HE and the ~EH commands serve to constitute the job header.

Information contained in the job header is made up of EKTASET commands. The commands supplied in the job header are the same commands supplied in the page level content - the job itself. Only the scope of the commands is altered by their placement. Commands contained in the job header affect every page in the complete job. Commands contained in the page level content apply only to the specific page in which they appear. The commands placed in the job header provide a preview of the commands to be used in the page level content.

The two major functions provided through use of a job header are printer preparation and printer configuration checking. Printer preparation includes the assignment of a job specific "handle" to printer resident objects as well as job specific definition of additional objects/entities to be used. These functions are critical to the assurance of efficient completion of the job.

Page Independence is an EKTASET feature, or mode of operation. It cannot be turned off; it is always valid. Any specific page within a document (of pages) does not depend on any of the surrounding pages to assist in the definition of its content. As a result of page independence, the appearance of a page if treated individually will be exactly the same as the appearance of the page if treated within the context and surrounding pages of the original document.

Page Independence is accomplished by manipulating specific sets of processing conditions at several points in the printing cycle such as power up/idle, start of job, job header processing, start of page, and page alteration.

The Job Header combined with specific changes made on the page level are sufficient to totally define the content of any specific page within a document.

EKTASET employs a Current Cursor Position to maintain position with respect to the Origin. Current Cursor Position is an entity that is always defined. The cursor is an entity of location. It has no associated size or magnitude, but consists simply of position.

The cursor moves from location to location within a page as a result of text and graphics operations. It is dynamic in location through time. However, the cursor does not maintain any historical information relating to its travels - it has no magnitude or direction - it remains at all times, simply an entity of location.

Current cursor position is not limited to the extent of a physical page, or even to positive quantities with respect to the defined origin. If operation 'A' draws a line that goes off of the page, the current cursor position will be established and maintained off the page. If operation 'B' draws a line to a visible point on the document, that line will be defined between the point off the page and the new point. The current cursor position will then be established at the newly defined end point.

Text output and some graphic objects use the current cursor position as a starting point.

Cursor positioning can be controlled in many ways. It can be explicitly set in absolute coordinate space with the ~PO - Position command. It can be moved in incremental coordinate space using the ~IX and ~IY - Increment X and Y commands respectively. Absolute coordinate space is measured from the current origin. Incremental coordinate space is measured from the current cursor position. The current cursor position is altered as an effect of processing ASCII carriage control characters.

Several EKTASET operations alter the current cursor position as a natural effect of the functions they perform. As an example, the ~DA - Draw Absolute command will set the current cursor position at the last absolute coordinate defined by the command.

Margins in EKTASET are controlled according to the following premises:

- "Horizontal" is measured on the X-axis as defined by the Origin.
  "Vertical" is measured on the Y-axis as defined by the Origin.
- Both margin commands require two parameters
  ll - lower limit,    ul - upper limit
  Four single parameter commands exist
     HB - Horizontal Begin
     HN - Horizontal eNd
     VB - Vertical Begin
     VN - Vertical eNd

- A complete margin specification of (horizontal & vertical) x (lower limit & upper limit) defines a "Text Boundary Rectangle"
- Neither a change in Orientation,
    Origin, or
    Text Orientation
  changes the positioning of the text boundary rectangle with respect to the origin
- The "Text Writing Direction," as determined by a combination of
    Orientation,
    Origin, and
    Text Orientation
  will establish the function of each side of the text boundary rectangle
- Horizontal tabs will be measured with respect to the "Primary Advance" component of the text writing direction within the text boundary rectangle.
  Vertical tabs will be measured with respect to the "Secondary Advance" component of the text writing direction within the text boundary rectangle.

In the EKTASET language, all variable length parameter strings require a terminator. Fixed length parameter strings follow rules according to the parameter format(s) in use for the command, as:

- Character coded ONLY values require no separators or a terminator.
- Floating point values, and all mixed mode parameter strings require both separators and a terminator.

The separator character is the comma ,
The terminator character is the semi-colon ;
The negative value indicator character is the dash -

In the following description of exemplary EKTASET commands, the tilda character ~ is used to represent the non-printable escape character. Command mnemonics are shown as two UPPER CASE characters. Parameters are shown in lower case, with descriptions following to identify their meanings. Where two syntax examples are shown, the first is applicable to the floating point and the second is applicable to the character coded parameter format specification method.

EKTASET COMMANDS

COMMAND: HEADER
SYNTAX:                         SCOPE:
~HE                             Coupled with End Header DESCRIPTION:
Designate start of job (printer default conditions re-established) and beginning of information used for job level definition.

Information contained between the Header and End Header commands is compiled to provide three effects. They are:
- establish initial processing conditions for each page of the job and
- perform printer preparation
- perform printer configuration checking as described in the Job Header discussion above.

COMMAND: IDENTIFICATION

SYNTAX:                         SCOPE:
~IDji;                          Set Mode
where: ji = job identifier DESCRIPTION:
Specify a reference name for a job.
The job identifier can be up to 64 characters in length.
If multiple identification commands are issued, the last one will establish the job's identifier.

COMMAND: PARAMETER FORMAT
SYNTAX:                         SCOPE:
~PFfm                           Set Mode
where: fm = format mode

DESCRIPTION:

Specify the method used for command parameter coding.

This command establishes the mode of parameter specification format applied to subsequently supplied parameters.

Refer to the section entitled "Command Language Parameter Formats" for discussion of the options and their use.

```
Format modes supported are:
    0 = floating point (default)
    1 = 1-byte character coded
    2 = 2-byte character coded
    3 = 3-byte character coded
    A = floating point rational
    B = 1-byte character coded rational
    C = 2-byte character coded rational
    D = 3-byte character coded rational
```

COMMAND: ORIENTATION
SYNTAX:                         SCOPE:
~ON#                            Set Mode
where: # = 0 - Portrait
       1 - Landscape

DESCRIPTION:

Specify relationship of top to a document.

COMMAND: POSITION
SYNTAX:                         SCOPE:
~POxc,yc;                       Immediate
~POxcyc
where: xc = x-coordinate component
       yc = y-coordinate component

DESCRIPTION:

Position cursor at absolute location with respect to the origin.

COMMAND: INCREMENT X
SYNTAX:                         SCOPE:
~IXim;                          Immediate ~IXim where: im = increment magnitude

DESCRIPTION:

Position cursor at relative x-offset with respect to the current position.

COMMAND: WINDOW

SYNTAX:                             SCOPE:
~WIx1,y1,x2,y2;                     Set Mode
~WIx1y1x2y2 where: x1 = x-coordinate component of corner 1
       y1 = y-coordinate component of corner 1
       x2 = x-coordinate component of corner 2
       y2 = y-coordinate component of corner 2

DESCRIPTION:

Specify a rectangular area, in absolute coordinates, that bounds the desired visible portion of successive objects.

Objects defined to be inside the window will be completely visible.

Objects defined to be outside the window will update document parameters as processed, but will not be visible.

Objects defined to be both inside and outside the window will update document parameters as processed, but will only be visible within the window.

COMMAND: DRAW ABSOLUTE

SYNTAX:                             SCOPE:
~DAx1,y1,x2,y2,...,xN,yN;           Immediate
~DAx1y1x2y2 ... xNyN;

where: x# = x-coordinate component of point #
       y# = y-coordinate component of point #

DESCRIPTION:

Creates a line string from the current cursor position to the points specified. The parameter list contains a sequence of ordered (x,y) pairs that define points along the line string. The number of points specified is variable; the parameter list requires a terminator.

The start and end points of the line string, defined by the current cursor position and xN,yN respectively, will be line capped, while the internal points will be line joined.

The current cursor position is established at point xN, yN.

COMMAND: LINE INCREMENTAL
SYNTAX:                SCOPE:
~LIix1,iy1,ix2,iy2;    Immediate
~LIix1iy1ix2iy2 where: ix1 = incremental x-coordinate component of point 1
       iy1 = incremental y-coordinate component of point 1
       ix2 = incremental x-coordinate component of point 2
       iy2 = incremental y-coordinate component of point 2

DESCRIPTION:
Creates a line with a starting point ix1,iy1 away from the current cursor position to a point ix1,iy2 away from the starting point.

This command will produce single lines only.

Line strings, or connected lines are produced with the Draw commands.

Both endpoints of the line will be line capped.

The current cursor position is established at the point defined by the sum of the increments specified.

COMMAND: LINE WIDTH
SYNTAX:                SCOPE:
~LWlw;                 Until next Line Width command
~LWlw where: lw = line width DESCRIPTION:
Specify the weight of graphic objects to be created.

COMMAND: DEFINE BITMAP

SYNTAX:                          SCOPE:

~ABfn;                           Global definition where: fn filename.ext - maximum 8chars.3chars.

DESCRIPTION:

Designate parameters associated with the named bitmap object.

Parameters must be of the form:
Bit Planes: 1, 2, 3, or 4
for each bit plane specified:
Origin: 0 = upper left, 1 = lower left
Scan Direction: 0 = horizontal (primary)
/ vertical
1 = vertical (primary)
/ horizontal Format: 0 = unpadded
1 = padded to eight bit bytes
2 = padded to sixteen bit words
Size: # pixels horizontal(/vertical)
pixels vertical(/horizontal)
according to the Scan Direction specified

EKTASET FORMS

A unique aspect of the EKTASET language is its ability to handle forms.

A form is an entity that can be defined with the EKTASET language.

In general, a form is a document of static information with areas designated for insertion of variable information. Traditional use shows preprinted forms stock being inserted into typewriters or printers for the manual addition of the variable data. The EKTASET supported entity provides the capability to electronically define both the static and variable portions of a form separately, and merge them together at print time using plain paper source documents.

An EKTASET form is made up of a collection of commands designed to remain constant throughout its life. Once defined, a form can be used to render base level information on a page by page basis. A global form is automatically activated at the beginning of each new document page. A regular form must be explicitly activated with the Use Form command.

The EKTASET form specifically, is a macro definition of linked EKTASET functions that supports interaction with an EKTASET job for processing of variable data. To control the operation of a form, four commands are used. Define Form and Global Form both initiate the definition of an EKTASET form entity. The Global Form command will automatically activate on each new page of a document, and is limited to a quantity of two. The Form K(C)omplete command terminates definition of both form types. The Use Form command activates a particular form from a collection of assigned forms at a specific place in the document.

A form is activated at the beginning of a page. However, in certain instances, the form can be activated at the end of (or within) a page if desired.

Stored in a form definition is a series of commands in User defined order that represent the static form information. Variable data is supplied in the body of the job. The Main/Form transfer command controls the process flow between the static form definition and the variable job data. If encountered while processing the form, control is transferred to the job data; if encountered while processing the job, control is transferred to the form definition.

The following commands are representation of the forms commands in EKTASET:

COMMAND: DEFINE FORM
SYNTAX:                   SCOPE:
~DFfn;                    Coupled with Form Komplete
where: fn = filename.ext - maximum 8chars.3chars.
DESCRIPTION:

Designate beginning of information used for form definition.

Information contained between the Define Form and Form Komplete commands defines both the rendering information of the static form, and the control information for switching from the form to the job.

NOTE: General and Global form use is different in the following way: A ~DF - Define Form / ~FK - Form K(C)omplete structure is only sufficient to create a description of a desired form. In order to be used within a specific job - including the job that defines it - the two step process of ~AS - ASsign and ~UF - Use Form must be followed.

COMMAND: MAIN FORM TRANSFER
SYNTAX:                         SCOPE:
~MF                             Immediate DESCRIPTION:
Passes control between a form and a job.
This command is the mechanism used for integrating variable job data into static form data.

If encountered within a form, processing of the form is suspended and control is passed to the job. If encountered within a job, processing of the job is suspended and control is passed to the form. Processing through both the form definition and the variable job data is performed automatically until the end of the variable job data page is encountered.

APPENDIX C

Printer Command Set

Printer Command Set or PCS is the interface language between the host computer system and the printer that deals specifically with job and printer control.

Scope of Commands

Scope is the duration of the change or effect caused by sending a PCS instruction to the printer.

Factory: Some printer parameters may have default values that are set at the factory. This is the broadest level of scope. These values can not be changed by the user.

Power-Up: The printer also may have a set of current power-up defaults for certain parameters. Some of these may differ from the factory defaults, and could be changed by the administrator of the printing system.

Until Power Down: Changes can also be made to the printing configuration that remain in effect until the printer is powered down.

Until End of Job: The next level of scope is a change in printing parameters that remains in effect until the end of the current job. For example one special job may be printed using tumble duplexing (two-sides, with pages turning like a calendar) on yellow ledger size paper. Obviously these unique printer parameters should have no effect on other print jobs sent to the same printer.

Until End of Set: The next level of scope would remain in effect until the end of the current set. A print job may consist of multiple sets, or copies, of the same data. Yet, there may be some variations made from one copy to the next. Perhaps three part forms are being initiated where copy one is white, copy two is pink, and copy three is yellow.

Until End of Page: Some commands may affect only the printing of the current page within a job. The scope of these commands is until the end of the current page.

Command Types

Printer Command Set can be logically partitioned into three types of printer commands. These three types are Object Management, Job Control, and RIP Management. This logic partitioning of commands reflects both the difference in the function that is performed as well as an implied scope for the duration of the change caused by this command.

RIP Management: These commands provide control of the RIP's configuration from the host. The scope of these commands falls primarily within the levels of setting power-up defaults, or setting defaults that endure until power down.

Object Management: The second type is the Object Management commands. These commands allow management of a range of logical objects in the RIP. These objects include: fonts, forms, logos, bitmaps, and textures.

Commands are available to download any of these objects from the host to the RIP. These downloading commands will cause these objects to be stored in the RIP's file system in the RIP's own internal object format.

These objects may also be deleted from the RIP'S file system using other object Management Commands.

The Load commands will inform the RIP that the named objects are going to be utilized by the next print job, thus causing these objects to be brought into memory from disk.

The Inquire commands will allow a host with bi-directional communications to query the printer regarding the resources that are available.

Job Control: These commands control the parameters that will be used for printing the accompanying job. For example, these commands might specify ten collated sets, with two staples, front and back covers, offset stacking of the sets, duplex output, on white letter size paper, with blue covers.

There are a few commands which have an immediate one time effect. For example, within a duplex document you may wish to force the next page image to be printed on the front side of the next sheet of page.

Entrance Into and Exit Out of PCS

Assume that the printer is currently inside a language emulator (Epson FX, Diablo 630, etc.).

esc> esc>[ where esc> is a one byte value of 0x1B and '[' is a one byte value of 0x5B.

The byte sequence, "escape, escape, left-square bracket" puts the printer into PCS mode. The terminating character is ']' (a right-square bracket) having a one byte hexadecimal value of 0x5D. This puts the printer back into a language emulation mode. Note, this may be a new language emulation mode that differs from the emulator in effect prior to the escape into PCS.

Syntax for Delimiting Functions and Parameters

The semicolon symbol ';' (0x3B) is used to delimit functions within a printer command string. The comma symbol ',' (0x2C) is used to delimit parameters within a single function.

If the same command is issued more than once, then the last instance of that command is the value that will apply.

The PCS Instructions

Each of the PCS instructions is described below. For each instruction the syntax for the command and optional arguments is given. In addition the issues of scope as related to that particular command will be explained.

In general the scope of a job control command is until the end of the current job. However, if these job control commands are included in a series of printer commands which includes a command to save this current configuration, then this may extend the scope of these commands to become the current default and power-up values.

RIP Management Commands

Command: Save Configuration
Syntax: SC
Options: configuration_name
Scope: Until reset When no optional configuration_name is supplied this command will cause the current configuration to be saved as the new power-up configuration.

Command: Reset to Power-up configuration
Syntax: RP
Options: none
Scope: Until Reset Reset the printer to the power-up defaults. This command will also clear the print buffer and free memory allocated for previous jobs.

Command: Reset to Factory configuration
Syntax: RF
Options: none
Scope: Until Reset Reset the printer to the factory defaults. This command will also clear the printer buffer and free memory allocated for previous jobs.

Command: select Instruction Set

Syntax:     ISn
Options:    1 - Diablo630
            2 - Epson FX-80
            3 - HP Laser Jet Series II (PGL)
            4 - HP 7475 (HPGL)
            5 - IBM Proprinter
            6 - Ektaset
Scope:      Until end of job This command allows the user to set the instruction set for the current job.

Command:    Separation Page
Syntax:     SPn
Options:    0 - disable, off, false
            1 - enable, on, true
Scope:      Until reset When enabled, the printer will automatically print a separator sheet between jobs.

Command:    Time-out selection
Syntax:     TIn
Options:    1 to 999 seconds
Scope:      Until reset The printer will use an activity time-out scheme to determine when a port or job has become inactive so that control may be given to another job or port.

Job Control Commands

Command:    Start Job
Syntax:     SJ
Options:    none

In typical usage a series of printer initialization commands may be sent to a printer just ahead of the job's data stream to initialize the printer for the job which follows. The Start Job command is in the first PCS command included in an initialization string which preceeds a job.

Command: select number of COpies
Syntax: COn
Options: numeric value (maximum value is printer dependent)
Scope: Until end of job
Default: 1

This will cause multiple copies of the current job to be generated.

Command: select CoLlation or non-collation
Syntax: CLn
Options: 0 - disable, off, false
1 - enable, on, true
Scope: Until end of job If set collation is enabled, and the job also has requested multiple copies (see CO), then this will cause the copies to be delivered as collated sets. For example, three copies of a three page document with collation enabled yields 1-2-3-1-2-3-1-2-3, while collation disabled yields 1-1-1-2-2-2-3-3-3.

Command: Paper Supply
Syntax: PSn
Options: 0 - manual feed
1 - primary paper supply
2 - second paper supply
4 - third paper supply
8 - fourth paper supply
16 - fifth paper supply
32 - sixth paper supply
Scope: Until end of job The paper supplies are each represented by a bit in the integer 'n'. Multiple paper supplies may be selected by or-ing the bits together for them (i.e. by adding together their option numbers).

Command: Paper Exit
Syntax: PXn
Options: 0 - don't care
1 - primary exit

```
                2 - second exit
                4 - third exit
                8 - fourth exit
Scope:     until end of job
```

On intelligent printers with finishing options the selection of paper exit is determined by the finishing parameters specified.

```
Command:   Paper Type selection
Syntax:    PTs,w,c,t
Options:   size, weight, color and type.
           Size is a mandatory parameter, the
           specification of weight, color and type are
           optional.
    Size options:   0 - don't care
                    1 - US Letter (8.5 x 11 in.)
                    2 - US Legal (8.5 x 14 in.)
                    3 - A4 (210 x 297mm)
                    4 - envelope (4.125 x 9.5 in.)
                    5 - ledger (11 x 17 in.)
                    6 - statements (8.5 x 5.5 in.)
                    7 - A3 (297 x 420mm)
                    8 - B4 (257 x 364mm)
                    9 - B5 (182 x 257mm_
                   10 - govt. letter (8 x 10 in.)
                   11 - foolscap (8.5 x 13 in.)

Weight options: 0 - don't care
                    1 - 16# bond
                    2 - 20# bond
                    3 - 24# bond
                    4 - 28# bond
                    5 - 32# bond
                    6 - 36# bond
                    7 - 40# bond
                    8 - 50# cover
                    9 - 60# cover
                   10 - 65# cover
                   11 - 90# cover
                   12 - 110# index
```

Color options: 
0 - don't care
1 - special
2 - clear (transparency)
3 - red (cherry)
4 - yellow (canary)
5 - blue
6 - green (celery)
7 - white
8 - ivory
9 - buff
10 - tan
11 - orange (salmon)
12 - pink
13 - goldenrod
14 - gray
15 - lt. blue Type Options:
0 - don't care
1 - plain
2 - three hole punched
3 - 19 hole cerlox bind
4 - tabs
5 - labels
6 - letterhead Scope: Until end of job Paper Type fully describes the primary paper type to be used for the body of the document. The size field must be specified, the fields for write, color and type are optional. Any field not specified will default to the current system value.

Command: Form Feed (Force Front or eject page)
Syntax: FF
Options: none
Scope: current page Forces the printing of the current page image.

Command: Use Font
Syntax: UFo,ss,sp,p,h,st,w,t

Orientation:     o = 0 (portrait) or 1 (landscape)

Symbol Set:     ss = see Appendix B

Spacing:         Sp = 0 (fixed width) or 1 (proportional)

Pitch:           p = characters per inch

Height:          h = point size

Style:           st = 0 (upright) or 1 (italic)

Stroke Weight: w = 1 (light), 3 (medium), 5 (bold)

Typeface: t = see Appendix B

The user may specify a font completely by filling in all of the option fields. If the printers do not have the specified font, a best fit to the description will be chosen. If an option field is null, the current value for that font attribute will be used.

Command: set Margins (portrait)
Syntax:  MPt,b,l.r
Options: Top Margin (in lines)
         Bottom Margin (in lines)(usually not
         specified--see Lines per Page)
         Left Margin (in columns)
         Right Margin (in columns)

Although many applications use margin commands which are supported by most printers, there are cases in which a printer may be used for screen dumps or printing text files copied directly to the printer. To allow the user to adjust the output for these cases, margin setting commands may be sent from the host. These margin settings are in effect only until a margin command is encountered in the print job.

Command: Lines per Inch
Syntax:  LIn
Options: numeric value

The user may select the lines of text per inch. This feature also determines the total number of lines that could be printed on the page. The number of lines that will actually be printed on the page depends on the Lines per Page command setting.

Command: Lines per Page
Syntax: LPn
Options: numeric value

The user may select the number of lines per page, which may affect the size of the bottom margin, whether the printer will eject the page automatically, or whether the printer will eject a blank page after every printed page.

The actual number of lines that will fit on a page depends on the value set for Lines per Inch. If 6 Lines per Inch is selected for a US letter size page the maximum possible lines per page is 66. Some printers have an unprintable region at the margins of a page and will only allow some smaller number of lines to be printed.

Command: End Page
Syntax: EP
Options: none
Scope: current page

This command forces the printing of the current page image. The next page image is placed on the next available side, which depends upon where you are on a duplexed page. See also Force Front (FF) which does advance to next sheet of paper.

Command: End Set (or end report)
Syntax: ES
Options: none
Scope: immediate

Finishing operations are performed on set boundaries. If a job stream is composed of several concatenated reports or sets, this will allow finishing operations to be performed at this boundary.

Command: End of Job
Syntax: EJ
Options: none
Scope: immediate

This command will cause all of the parameters who's scope is "until end of job" to be rest to the current system values. This command may or may not be present in the job stream. Often the End of Job is signaled through a single byte value of $4_{16}$ in the data stream that is part of the data communications protocol layer or of the printer. If the communications layer, or a port Time-out occurs, these also signify the end of the current job which will reset default values.

Command: Error Handling
Syntax: EH
Options: 0 - abort
        1 - print one proof copy
        2 - continue and print all requested copies
            (do the best you can)
        3 - hold job in queue for operator
            intervention
Scope: until end of job
Privilege: all users This command sets the printer's error handling strategy in the event of a job set up request that is invalid, or for which requested resources are not available. For example, there may be a mismatch of paper color; a requested font or form may not be available; the printer may not support the requested finishing operation, etc. The system will have a default value for this parameter, but an individual job may over-ride that value.

Command: Offset Stack
Syntax: OSn
Options: 0 - false, straight stack multiple sets
        1 - true, offset stack multiple sets
Scope: until end of job This will cause multiple copies to be offset stacked. Offset stacking will occur at the boundary between sets or copies. This is one of the optional "finishing" operations that may occur at the end of a set (ES).

Command: STaple
Syntax: STw
Options: 0 - none
    1 - top corner staple
    2 - middle staple
    4 - bottom corner staple
    8 - top, set in about 2 inches
    16 - bottom, set in about 2 inches
Scope: until end of job Note that the locations can be combined by bit-wise or-ing of the locations. This is one of the optional "finishing" operations that may occur at the end of a set (ES).
Example: esc> est>[ST24] -- requests two staples set in 2 inches from the top and bottom edge of the paper.

Command: Black and White (monochrome output)
Syntax: BW
Options: none
Scope: end of job Force the current job to be printed in black and white, even if it contains color information. This may be used for proofing a color document on a color device. It may also be used in an advisory manner to indicate to a color output device that the current job contains only black and white information.

Command: user IDentification
Syntax: IDname
Options: name = any ASCII string up to 8 characters--except ';' or ']'
Scope:

On a multiple port printer the printer may maintain an identification/user name for each port. The name can be up to 8 characters long. It will be used when printing port separation sheets as well as when indicating action on the Control Panel.

APPENDIX D
MX COMMANDS
Diagnostic Commands:

Command: Run Diagnostic C
Hexcode: OC
Steps  1
Function:      Invokes execution of the MX 42 internal control path diagnostic. Upon completion, status is returned to the MPU 40.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 0 | 1 | 1 | 0 | 0 | x | x | x | x | x | x | x | x | x | x | x |

Usage:         This diagnostic can be invoked at any time to provide a cursory check on general MX 42 health. No prior initialization of the board is required.

Command: Run Diagnostic D
Hexcode: OD
Steps: 1
Function:      Invokes execution of the MX 42 internal data path diagnostic. Upon completion, status is returned to the MPU 40.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 0 | 1 | 1 | 0 | 1 | x | x | x | x | x | x | x | x | x | x | x |

Usage:         This diagnostic can be invoked at any time to provide a good confidence level that the basic mapping data path is functional.

Command: Error Code
Hexcode: 0F
Steps:  1
Function:   Allows the MPU 40 to set the error status.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 0 | 1 | 1 | 1 | 1 | X | X | X | X | X | X | X | E2 | E1 | E0 | 0 |

Usage:  E2 - E0 = MX 42 Error code from MPU 40 testing of MX 42 RAM arrays.

| Error Condition | E2-E0 Binary Code |
|---|---|
| TRAM failure | 5 |
| PRAM failure | 4 |
| FRAM failure | 3 |
| FCX failure | 2 |

Note: D0 bit must be low (0) to indicate MX 42 *not* OK.

Setup Commands:

Command: Set Page Height
Hexcode: 06
Steps  1
Function:   Allows the MPU 40 to program height of image to be constructed in OPU page memory. MX 42 will format OPU memory accordingly for all subsequent mapping and readback operations. Page height must be an integral number of 16-bit words.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 0 | 0 | 1 | 1 | 0 | <----------- XMAX (in Words) -----------> | | | | | | | | | | |

Usage:  XMAX can describe a 2K word high page (e.g. 109 in. @ 300 dpi or 18 in. @ 1800 dpi).

Command: Set Texture
Hexcode: 07
Steps 1
Function: Allows the MPU 40 to select 1 of 32 different textures that currently reside in TRAM 102a. MX 42 will use this texture for all subsequent mapping operations. The MPU 40 must insure that TRAM 102a has been loaded with the appropriate texture patterns.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 0 | 0 | 1 | 1 | 1 | X | X | X | X | X | X | <--- Texture # ---> ||||

Command: Set Color/Tint
Hexcode: 08
Steps: 1
Function: Allows the MPU 40 to perform any or all of the following functions: change tint level, change color mode or change color plane. All functions affect the way subsequent objects are mapped to OPU page memory.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | 0 | 0 | 0 | 0 | 0 | <----- Tint Level ----> |||||| 0 | 0 | 0 | 0 |
| 1b | C | 0 | 1 | 0 | 0 | 0 | X | X | X | X | X | X | X | ST | CM | <-CP*-> ||

Background: Each Tint Generator (TG) is segmented into 4 quandrants at 64 tints per quandrant. Quandrants are accessed by color plane number. This provides for a unique set of 64 tints for each of 4 color planes. The Tint Generator (TG) occupies the top 256 words of the 4M x 16 ideal OPU page memory space. The TG address is computed using the MX 42 Page Address Generator using the following algorithm:

$$TGS = (64)(65535) + \text{Tint Level}$$

Serial color mode uses both banks of the single plane of OPU page memory to render individual color separations in a serial ping-pong manner (i.e. Bank 0 = Cyan, Bank 1 = Magenta, Bank 0 = Yellow, Bank 1 = Black).

Parallel color mode requires the addition of three parallel planes of memory to the single plane of OPU page memory to render all 4 color separations in parallel.

Usage: Tint Level specifies 1 of 64 possible tints to be selected for subsequent mapping of objects. Each tint is organized as either an 8 x 8, 4 x 4 or 2 x 2 superpixel and stored as 8 bytes of data within each TG PROM.

ST = Set Tint bit (active high); informs the MX 42 that a change to the specified tint level of the appropriate Tint Generator has been requested. Upon detecting a request to change tint, the MX 42 will calculate the corresponding address to the proper OPU Tint Generator and perform a single write to set the specified tint level. If this bit is not set when the command is issued, the MX 42 does not execute the write and ignores the contents of the XREG.

CM = Color Mode Bit (1 = Serial mode, 0 = Parallel mode); allows the MPU 40 to select color mapping mode for subsequent mapping operations. Color mode can be changed without changing tint level.

CP# = Color Plane # (1 of 4); allows the MPU 40 to select color plane for any of the following operations:

Set Tint: If serial color mode is specified, then CP#=n specifies that the "nth" quandrant of the tint generator to be selected for use in subsequent mapping operations. IF parallel color mode is specified, then CP#=n specifies that the "nth" quandrant of the "nth" tint generator (i.e. 0, 1, 2 or 3) be selected for use in subsequent mapping operations.

Mapping Objects: If serial color mode is specified, then CP#=n specifies that the "nth" color plane be affected with data output from the "nth" tint generator. If however parallel color mode is specified, then CP# is ignored
and all color planes are affected with data output from each respective tint generator.

Read Region: CP#=n specifies that the "nth" color plane be read from.

Color plane # can be changed without changing tint level.

Command: Set Clipping Window Function
Hexcode: 09
Steps: 2
Function: Allows the MPU 40 to define a rectangular region within page memory space, outside of which all objects rendered will be clipped. The user may enable or disable the window and/or set clipping window limits.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <-- | -- | -- | -- | -- | -- | X1 | -- | -- | -- | -- | -- | -- | -- | --> |
| 1b | Y | 0 | <-- | -- | -- | -- | -- | -- | Y1 | -- | -- | -- | -- | -- | -- | -- | --> |
| 1c | C | 0 | 1 | 0 | 0 | 1 | X | X | X | X | X | X | X | X | X | SL | E/D |
| 2a | X | 0 | <-- | -- | -- | -- | -- | -- | X2 | -- | -- | -- | -- | -- | -- | -- | --> |
| 2b | C | 0 | <-- | -- | -- | -- | -- | -- | Y2 | -- | -- | -- | -- | -- | -- | -- | --> |

Background: The clipping window function can be used to produce special graphic effects or to cleanly frame the image area to eliminate "wraparound" when objects are mapped over page boundaries.

Usage:  X1, Y1 = Lower boundary limit point for window.

X2, Y2 = Upper boundary limit point for window.

SL = Set Limit bit (active high); informs the MX 42 that a request has been made to change the limits per the values contained in the X and Y registers.

E/D = Enable/Disable window bit; (1 = enable, 0 = disable). A request to enable the window will affect subsequent mapping operations according to current limits. A request to disable the window will effectively remove the clipping function while retaining existing limits for future use.

The user can set limits and enable (or disable) the window in the same command. The user may also simply enable or disable the window by issuing only step 1c (CREG = 4801 or 4800 hex).

Command: Go Offline
Hexcode: 0A
Steps: 1
Function: Allows the MPU 40 to put the MX 42 off-line for access to MX 42 memory arrays (i.e. TRAM, PRAM and FRAM 102a,b,c).

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 0 | 1 | 0 | 1 | 0 | X | X | X | X | X | X | X | X | X | X | X |

Usage: Issuance of any other MX 42 command will put the MX 42 back on-line for operational use.

Command: End of Page/Form
Hexcode: 0B
Steps: 1
Function: Processing of this command and receipt of the associated interrupt informs the MPU 40 that the MX 42 has completed mapping operations on the current page.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 0 | 1 | 0 | 1 | 1 | X | X | X | X | X | X | X | X | X | X | X |

Usage: Upon execution of this command, the MX 42 will activate the Form Feed Acknowledge interrupt.

Command: Set Arbitrary Windowing Mode 0
Hexcode: 10
Steps: 1
Function: Allows MPU 40 to select the following logic function for subsequent arbitrary window mode mapping operations:

New Data AND Old Data

Where: New Data represents a word of the object to be mapped and Old Data represents the corresponding word of the reference image in upper OPU page memory.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 1 | 0 | 0 | 0 | 0 | X | X | X | X | X | X | X | X | X | X | X |

Usage: This logic mode will remain in effect until either another logic mode is selected or an MX 42 reset occurs. This mode is the default mode initialized upon power-up reset.

Command: Set Arbitrary Windowing Mode 1
Hexcode: 11
Steps: 1
Function: Allows MPU 40 to select the following logic function for subsequent arbitrary window mode mapping operations:

New Data OR Old Data

Where: New Data represents a word of the object to be mapped and Old Data represents the corresponding word of the reference image in upper OPU page memory.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 1 | 0 | 0 | 0 | 1 | X | X | X | X | X | X | X | X | X | X | X |

Usage: This logic mode will remain in effect until either another logic mode is selected or an MX 42 reset occurs.

Command: Set Arbitrary Windowing Mode 2
Hexcode: 12
Steps: 1
Function: Allows MPU 40 to select the following logic function for subsequent arbitrary window mode mapping operations:

New Data XOR Old Data

Where: New Data represents a word of the object to be mapped and Old Data represents the corresponding word of the reference image in upper OPU page memory.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 1 | 0 | 0 | 1 | 0 | X | X | X | X | X | X | X | X | X | X | X |

Usage: This logic mode will remain in effect until either another logic mode is selected or an MX 42 reset occurs.

Command: Set Arbitrary Windowing Mode 3
Hexcode: 13
Steps: 1
Function: Allows MPU 40 to select the following logic function for subsequent arbitrary window mode mapping operations:

New Data AND (Old Data)/

Where: New Data represents a word of the object to be mapped and (Old Date)/ represents the 1's Complement of the corresponding word of the reference image in upper OPU page memory.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | c | 1 | 0 | 0 | 1 | 1 | x | x | x | x | x | x | x | x | x | x | x |

Usage: This logic mode will remain in effect until either another logic mode is selected or an MX 42 reset occurs.

Command: Set Arbitrary Windowing Mode 4
Hexcode: 14
Steps: 1
Function: Allows MPU 40 to select the following logic function for subsequent arbitrary window mode mapping operations:

New Data OR (Old Data)/

Where: New Data represents a word of the object to be mapped and (Old Data)/ represents the 1's Complement of the corresponding word of the reference image in upper OPU page memory.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 1 | 0 | 1 | 0 | 0 | X | X | X | X | X | X | X | X | X | X | X |

Usage: This logic mode will remain in effect until either another logic mode is selected or an MX 42 reset occurs.

Command: Set Arbitrary Windowing Mode 5
Hexcode: 15
Steps: 1
Function: Allows MPU 40 to select the following logic function for subsequent arbitrary window mode mapping operations:

New Data XOR (Old Data)/

Where: New Data represents a word of the object to be mapped and (Old Data); represents the 1's Complement of the corresponding word of the reference image in upper OPU page memory.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | C | 1 | 0 | 1 | 0 | 1 | X | X | X | X | X | X | X | X | X | X | X |

Usage: This logic mode will remain in effect until either another logic mode is selected or an MX 42 reset occurs.

Command: Set Origin Offset
Hexcode: 17
Steps: 1
Function: Allows the MPU 40 to set the current offset from the MX 42 coordinate origin (0,0). The offset is specified independently as two values $X_o$ and $Y_o$ and stored in a register in the MX ALU 112. Upon execution of Diagnostic C, the register is initialized to a value of $X_o = 0$ and $Y_o = 0$. Issuance of the SetOriginOffset command sets the Xo and Yo values to be used in subsequent mapping or readback operations. During setup of each mapping or readback command, the following calculations are performed prior to execution:

$$\text{Starting } X = X_i + X_o$$
$$\text{Starting } Y = Y_i + Y_o$$

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <---------------- Xo ----------------> | | | | | | | | | | | | | | |
| 1b | Y | 0 | <---------------- Yo ----------------> | | | | | | | | | | | | | | |
| 1c | C | 1 | 0 | 1 | 1 | 1 | x | x | x | x | x | x | x | x | x | x | x |

Background: The origin offset feature can be used to replicate an object or set of objects (such as a form) in various places on a page without requiring additional pre-processing in the MPU 40 (Rasterizer).

The stored values for Xo and Yo will remain in effect until another SetOriginOffset command is issued or Diagnostic C is invoked.

Command: Set Line Attributes
Hexcode: 19
Steps: 1
Function: Allow the MPU to set the current values for line pattern and scale factor to be used during subsequent execution of the Map Bresenham Line command routine.

FORMAT:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | <------------ Line Pattern (MS) ------------> | | | | | | | | | | | | | | | |
| 1b | Y | <------------ Line Pattern (LS) ------------> | | | | | | | | | | | | | | | |
| 1c | C | 1 | 1 | 0 | 0 | 1 | * | * | * | <------ Scale Factor ------> | | | | | | | |

Usage: Line Pattern = Actual bit pattern of 1's and 0's that defines the pattern to be repeated over the course of mapping a Bresenham Line.

Scale Factor - An 8-bit counter that defines
the number of times each bit of the line
pattern is repeated over the course of
mapping a Bresenham Line. The pattern can
be rendered from 1:1 (SF=0) up through 256:1
(SF=255).

** This command is new and available upon
release of MX Microcode Version 2.0**

Mapping Commands:

Command: Map Character
Hexcode: 00
Steps: 1
Function: Initiates copying of a character bitmap from
FRAM 102a to OPU 44 page memory based on
preselected font and character attributes
(FREG), texture, tint and clipping window
limits. Starting destination address is
computed based on Xi, Yi, origin offset and
preselected page height.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <--------------------------------- Xi ---------------------------------> |
| 1b | Y | 0 | <--------------------------------- Yi ---------------------------------> |
| 1c | C | 0 | 0 | 0 | 0 | 0 | X | X | X | <------ Character Value ------> |

Usage: Xi - destination coordinate of lower left
hand corner of referenced character bitmap.
Least significant 4-bits of Xi determines
shift value used to align the data in OPU
memory.

Yi - destination coordinate of lower left
hand corner of referenced character bitmap.

Character Value - ASCII code of character to
be mapped. The code is 7-bit for standard
character sets and 8-bit for international
character sets.

The information specified in the FREG prior to invocation of a given Map Character command will be used during subsequent execution of that Map Character command. The FREG is double buffered and synchronized in hardware to writes to the CREG. This insures that changes to the FREG will not be incorporated until execution of the next Map Character command.

Command: Link Trapezoid
Hexcode: 18
Steps: 4
Function: Initiates filling of a defined trapezoidal area to OPU page memory based on preselected texture, tint and clipping window limits. Starting destination address and initial stroke height is retained internally by the MX and is based on the coordinates and stroke height of the final stroke mapped from the previous MapTrapezoid command.

FORMAT:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1 | C | 1 | 1 | 0 | 0 | 0 | * | * | * | * | * | * | * | * | * | * | * |
| 2 | C | 0 | <-------------------- Lines - 1 --------------------> |||||||||||||||
| 3a | X | S | <-------------------- m1 slope (MS) --------------------> |||||||||||||||
| 3b | C | <-------------------- m1 slope (LS) --------------------> ||||||||||||||||
| 4a | X | S | <-------------------- m2 slope (MS) --------------------> |||||||||||||||
| 4b | C | <-------------------- m2 slope (LS) --------------------> ||||||||||||||||

Usage: Vectors that are non-orthogonal to the axes are usually issued as three consecutive MapTrapezoid commands. For efficiency, the MPU can issue a single MapTrapezoid command for the left-most trapezoid and two successive LinkTrapezoid commands for the center and right-most trapezoids. The MX fills the linked trapezoid as a series of consecutive strokes. Each stroke is parallel to the X-axis. Mapping begins at (Xt + m1, Yt + 1) with an initial stroke height of (dX + m2) where:

Xt = destination coordinate of the stroke of
the previous MapTrapezoid command; defines
the lower left hand corner of the linked
trapezoid (i.e. left-most parallel side).
Least significant 4-bits of Xt determines
shift value used to align the data in OPU
memory.

Yt = destination coordinate of the last
stroke of the previous MapTrapezoid command;
defines the lower left hand corner of the
linked trapezoid (i.e. left-most parallel
side).

dXt = height of the last stroke mapped (from
the previous MapTrapezoid command) in pixels.

Lines - 1 = one less than the total number
of strokes to be written to fill the linked
trapezoid (e.g. for a two (2) pixel wide
linked trapezoid, Lines - 1 = 1). Note that
because the MX pre-decrements this value
prior to mapping, <u>the MPU must insure that a
LinkTrapezoid command is never issued for
the case where Lines - 1 = 0.</u> m1 slope = signed value of the slope of the
lower side of the linked trapezoid.

m2 slope = signed value of the slope at
which the stroke height changes for the
linked trapezoid as Y is incremented from Yt
to Yt + (Lines -1).

** This command is new and available upon
release of MX Microcode Version 2.0**

Command: Map Orthogonal Line (Map Stroke)
Hexcode: 02
Steps: 2
Function: Initiates mapping of one or more vertical
strokes to OPU page memory based on
preselected texture, tint and clipping window limits. Starting destination address
is computed based on Xi, Yi, origin offset
and preselected page height. Each stroke is
a single pixel wide line parallel to the
X-axis. Horizontal lines are composed of
multiple consecutive strokes where top and
bottom sides of the resulting rectangular
region are parallel to the Y-axis (i.e.
slope of both top and bottom sides = 0).

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <--------------------- Xi ---------------------> |||||||||||||||
| 1b | Y | 0 | <--------------------- Yi ---------------------> |||||||||||||||
| 1c | C | 0 | 0 | 0 | 1 | 0 | * | * | * | * | * | * | * | * | * | * | * |
| 2a | X | 0 | <--------------------- dXi (MS) ---------------------> |||||||||||||||
| 2b | Y | 0 | <--------------------- dXi (LS) ---------------------> |||||||||||||||
| 2c | C | 0 | <--------------------- Lines - 1 ---------------------> |||||||||||||||

Usage: The MX maps one or more consecutive strokes
as required. Each stroke is parallel to the
X-axis.

Xi - destination coordinate of the initial
stroke; defines the lower left hand corner
of the region (i.e. left-most parallel
side). Least significant 4-bits of Xi
determines shift value used to align the
data in OPU memory.

Yi - destination coordinate of the initial
stroke; defines the lower left hand corner
of the region (i.e. left-most parallel side).

dXi - height of the stroke(s) in pixels.
This is represented as a 32-bit value where
the integer part is passed via the X
register and the fractional part is passed
via the Y register.

Lines - 1 = one less than the total number
of strokes to be written to fill the region
(e.g. for a single stroke, Lines - 1 = 0).

Horizontal lines (paralle to the Y-axis)
that are 15 pixels or les in thickness (dXi
< 16), will be mapped using a optimization
algorithm which examines dXi and Xi to
determine whether 1 or 2 writes per stroke
to OPU memory should be performed.
Horizontal lines that are 16 or more pixels
in thickness (dXi > 15), will be mapped
using the standard MX technique of n+1
writes to OPU per stroke where n = stroke
height in words.

Command: Map Bresenham Line
Hexcode: 1A
Steps: 2 (or 3)
Function: Initiates drawing of a single pixel wide line to OPU page memory based on preselected texture, tint and clipping window limits. Starting destination address is computed based on X1, Y1, origin offset and preselected page height.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <----------------- X1 -----------------> | | | | | | | | | | | | | |
| 1b | Y | 0 | <----------------- Y1 -----------------> | | | | | | | | | | | | | |
| 1c | C | 1 | 1 | 0 | 1 | 0 | * | * | * | * | * | * | * | * | SLA | RLA | LSC |
| 2a | X | 0 | <----------------- X2 -----------------> | | | | | | | | | | | | | |
| 2b | Y | 0 | <----------------- Y2 -----------------> | | | | | | | | | | | | | |
| 2c | C | 0 | 0 | 0 | 0 | 0 | 0 | 0 | 0 | <------ Scale Factor ------> | | | | | | |
| 3 | C | 0 | <----------- Lines - 1 (Optional) -----------> | | | | | | | | | | | | | |

Usage: X1 = destination coordinate of the initial pixel to be written. Least significant 4-bits of X1 determines shift value used to align the data in OPU memory.

Y1 = destination coordinate of the initial pixel to be written.

X2 = destination coordinate of the final pixel to be written. Least significant 4-bits of X2 determines shift value used to align the data in OPU memory.

Y2 = destination coordinate of the final
pixel to be written.

Line Attribute/Control Option vits - if set,
the following operations will be invoked:

SLA:  Store Line Attributes - current
active pattern and scale factor
values will be saved away to
permanent storage prior to drawing
the line.

RLA:  Restore Line Attributes - active
registers will be loaded with
permanent stored pattern and scale
factor values prior to drawing the
line.

LSC:  Line Span Control - indicates that
an additional parameter will be
sent (Lines - 1 via the CREG) that
should be used as the line counter
in place of the dY or dX value
that is normally computed in
MapBresLine.

Scale Factor = reload value to be used over
the course of drawing the line whenever the
active scale factor value has decremented to
zero. This value allows the line pattern to
be scaled from 1:1 (SF = )) to 256:1 (SF = 256).

Lines - 1 = optional parameter sent from MPU
that specifies total span to be mapped
(starting at X1, Y1) in place of computed dX
(or dY) when LSC = 1.

** This command is new and available upon
release of MX Microcode Version 3.0**

Command: Map Bresenham Line #2
Hexcode: 1C
Steps 2 (or 3)
Function: Initiates drawing of a single pixel wide line to OPU page memory based on preselected texture, tint and clipping window limits. Starting destination address is computed based on X1, Y1, origin offset and preselected page height. Mapping commences at X1, Y1 with properly adjusted line pattern and scale factor values in order to provide continuity from the previous MapBresLine or MapBresLine2 command.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <------------------------- X1 -------------------------> ||||||||||||||| |
| 1b | Y | 0 | <------------------------- Y1 -------------------------> ||||||||||||||| |
| 1c | C | 1 | 1 | 1 | 0 | 0 | * | * | * | * | * | * | * | * | SLA | RLA | LSC |
| 2a | X | 0 | <------------------------- X2 -------------------------> ||||||||||||||| |
| 2b | Y | 0 | <------------------------- Y2 -------------------------> ||||||||||||||| |
| 2c | C | 0 | 0 | 0 | 0 | 0 | 0 | 0 | 0 | <------- Scale Factor -------> |||||||| |
| 3 | C | 0 | <------------- Lines - 1 (Optional) -------------> ||||||||||||||| |

Usage:  X1 = destination coordinate of the initial pixel to be written. Least significant 4-bits of X1 determine shift value used to align the data in OPU memory.

Y1 = destination coordinate of the initial pixel to be written.

X2 = destination coordinate of the final pixel to be written. Least significant 4-bits of X2 determines shift value used to align the data in OPU memory.

Y2 = destination coordinate of the final pixel to be written.

Line Attribute/Control Option bits - if set, the following operations will be invoked:

SLA: Store Line Attributes - current active pattern and scale factor values will be saved away to permanent storage prior to drawing the line.

RLA: Restore Line Attributes - active registers will be loaded with permanent stored pattern and scale factor values prior to drawing the line.

LSC: Line Span Control - indicates that an additional parameter will be sent (Lines - 1 via the CREG) that should be used as the line counter in place of the dY or dX value that is normally computed in MapBresLine.

Scale Factor - reload value to be used over the course of drawing the line whenever the active scale factor value has decremented to zero. This value allows the lfine pattern to be scaled from 1:1 (SF = 0) to 256:1 (SF = 256).

Lines - 1 = optional parameter sent from MPU that specifies total span to be mapped (starting at X1, Y1) in place of computed dX (or dY) when LSC = 1.

This command is new and available upon release of MX Microcode Version 3.0

Command: Map Bitmap
Hexcode: 03
Steps: N+2
Function: Aids in the transfer of a bitmapped image (single bit/pixel) of defined height and width to OPU page memory based on preselected texture, tint and clipping window limits. Starting destination address is computed based on Xi, Yi, origin offset and preselected page height. A 2X scaleup is available as an option.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <------------------------------- Xi -------------------------------> |  |  |  |  |  |  |  |  |  |  |  |  |  |
| 1b | Y | 0 | <------------------------------- Yi -------------------------------> |  |  |  |  |  |  |  |  |  |  |  |  |  |
| 1c | C | 0 | 0 | 0 | 1 | 1 | X | X | X | X | X | X | X | X | X | X | S |
| 2a | X | <------------------------ Words/Line ------------------------> |  |  |  |  |  |  |  |  |  |  | 0 | 0 | 0 | 0 |
| 2b | C | <------------------------------ Lines - 1 ------------------------------> |  |  |  |  |  |  |  |  |  |  |  |  |  |  |
| 3 -> N | C | <------------------------ Bitmap Data for N words ------------------------> |  |  |  |  |  |  |  |  |  |  |  |  |  |  |

Usage: The MX 42 maps each 16-bit word of linearized bitmap data (as received from the MPU 40) to OPU page memory at the desired X, Y location. Bitmap must be square with the XY axis.

Xi = destination coordinate of lower left hand corner of the reconstructed bitmap. Least significant 4-bits of Xi determines shift value used to align the data in OPU memory.

Yi = destination coordinate of lower left hand corner of the reconstructed bitmap.

Words/Line = height of the bitmap in words. Minimum W/L = 1.

Lines - 1 = one less than the total number of lines representing the width of the reconstructed bitmap.
A total of N words of bitmap data, where N = (W/L)(Lines), are passed to the MX 42 via the CREG. The MPU 40 must pass all words of the first line followed by all words of the second line, etc., until all lines have been transferred. The MX 42 can transfer the data at a rate of 600 ns/word.

S = Scaleup bit; an active high condition (1) informs the MX 42 that a 2X scaleup of the received image has been requested. For each image word received from the MPU 40, the MX 42 will perform a pixel by pixel doubling in both X and Y and write the resultant four (4) words to OPU memory.

Command: Rotate Bitmap
Hexcode: 16
Steps: N+2
Function: Simultaneously performs a 90° clockwise rotate and transfer of a bitmapped image (single bit/pixel) of defined height and width to OPU page memory based on preselected texture, tint and clipping window limits. Starting destination address is computed based on $X_i$, $Y_i$, origin offset and preselected page height.

Format

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <----------- Xi -----------> | | | | | | | | | | | | | | |
| 1b | Y | 0 | <----------- Yi -----------> | | | | | | | | | | | | | | |
| 1c | C | 1 | 0 | 1 | 1 | 0 | * | * | * | * | * | * | * | * | * | * | * |
| 2a | X | <----------- Words/Line -----------> | | | | | | | | | | | 0 | 0 | 0 | 0 |
| 2b | C | <----------- Lines - 1 -----------> | | | | | | | | | | | | | | | |
| 3 -> N | C | <----------- Bitmap Data for N words -----------> | | | | | | | | | | | | | | | |

Usage: The MX rotates and maps each 16-bit word of linearized bitmap data (as received from the MPU) to OPU page memory at the desired, X,Y location. Bitmap must be square with the XY axis.

$X_i$ = destination coordinate of <u>upper left hand corner</u> of the reconstructed bitmap. Least significant 4-bits of $X_i$ determines shift value used to align the data in OPU memory.

$Y_i$ = destination coordinate of <u>upper left hand corner</u> of the reconstructed bitmap.

Words/Line = height of the bitmap in words. Minimum W/L = 1.

Lines - 1 = one less than the total number of lines representing the width of the reconstructed bitmap.

See Figures 7-10.

A total of N words of bitmap data, where N = (W/L)(Lines), are passed to the MX of the CREG. The MPU must pass all words of the first line followed by all words of the second line, etc., until all lines have been transfered. The rate at which the MX can rotate and transfer the data is dependent upon how many pixels are 'high' in the word since each 'high' pixel requires that a full word write be performed on OPU memory.

e.g. A word of all 'ones' will be processed at <u>18.4 usec/word</u> for all words within a line and <u>18.8 usec/word</u> for the last word in a line. A word of all 'zeroes' will be processed in <u>1.0 usec/word</u> for all words within a line and <u>1.4 usec/word</u> for the last word in a line.

Note that 2X scalling <u>cannot</u> be performed during rotation of a bitmap.

This feature is new and available upon release of MX Microcode Version 3.0.

Command: Fill Region
Hexcode: 05
Steps: 2
Function: Initiates filling of a rectangular region of defined height and width in OPU 44 page memory based on preselected texture, tint and clipping window limits. Starting destination address is computed based on Xi, Yi, origin offset and preselected page height.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <---------------------------------- Xi ----------------------------------> | | | | | | | | | | | | | | |
| 1b | Y | 0 | <---------------------------------- Yi ----------------------------------> | | | | | | | | | | | | | | |
| 1c | C | 0 | 0 | 1 | 0 | 1 | X | X | X | X | X | X | X | X | X | X | X |
| 2a | X | <------------------------- Words/Line ------------------------> | | | | | | | | | | | | 0 | 0 | 0 | 0 |
| 2b | C | <------------------------------- Lines - 1 -------------------------------> | | | | | | | | | | | | | | | |

Usage: The MX 42 maps the appropriate number of 16-bit words to OPU page memory at the desired X,Y location. Fill data mapped depends on predefined texture and tint (e.g. texture = solid & tint = "white" will clear the region). The filled region must be square with the XY axis.

Xi = destination coordinate of lower left hand corner of the rectangular region to be filled. Least significant 4-bits of Xi determines shift value used to align the data in OPU memory.

Yi = destination coordinate of lower left hand corner of the rectangular region to be filled.

Words/Line = height of the bitmap in words. Minimum W/L = 1.

Lines - 1 = one less than the total lines representing the width of the filled region.

Command: Map Stored Image
Hexcode: 1B
Steps: 3
Function: Initiates copying of a stored image from FRAM to OPU page memory based on preselected texture, tint and clipping window limits. Starting address in OPU memory is computed based on Xi, Yi, origin offset and preselected page height.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <-- | -- | -- | -- | -- | -- | Xi | -- | -- | -- | -- | -- | -- | -- | --> |
| 1b | Y | 0 | <-- | -- | -- | -- | -- | -- | Yi | -- | -- | -- | -- | -- | -- | -- | --> |
| 1c | C | 1 | 1 | 0 | 1 | 1 | * | * | * | * | * | * | * | * | * | * | * |
| 2a | X | <-- | -- | -- | -- | -- | Words/Line | -- | -- | -- | --> | 0 | 0 | 0 | 0 | | |
| 2b | C | <-- | -- | -- | -- | -- | -- | Lines - 1 | -- | -- | -- | -- | -- | -- | -- | -- | --> |
| 3a | X | <-- | -- | -- | -- | FRAM Start Address (MS) | -- | -- | -- | -- | -- | --> | | | | | |
| 3b | C | <-- | -- | -- | -- | FRAM Start Address (LS) | -- | -- | -- | -- | -- | --> | 0 | | | | |

Background: The MX reads all words from the first line, followed by all words in the second line, etc., until all lines of the image have been mapped to OPU. It is assumed that the image has been stored in FRAM in a linearized fashion.

Usage: Xi = destination coordinate of lower left hand corner of the reconstructed image.

Yi = destination coordinate of lower left hand corner of the reconstructed image.

Words/Line = height of the image in words. Minimum W/L - 1.

Lines - 1 = one less than the total number of lines representing the width of the image.

FRAM Start Address = Starting locatin in FRAM where referenced image is to be read from.

Readback Commands:

Command: Read Region
Hexcode: 04
Steps: 3
Function: Initiates a copy process by which the MX 42 will sequentially read a rectangular region
of defined height and width from OPU page
memory and write it into FRAM 102a starting
at a specified address. Starting address in
OPU memory is computed based on Xi, Yi,
origin offset and preselected page height.

Format:

| STEP# | REG. | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|
| 1a | X | 0 | <----------------------- Xi -----------------------> |||||||||||||||
| 1b | Y | 0 | <----------------------- Yi -----------------------> |||||||||||||||
| 1c | C | 0 | 0 | 1 | 0 | 0 | x | x | x | x | x | x | x | x | 1 | <-CP#-> ||
| 2a | X | <---------------- Words/Line ---------------> |||||||||||| 0 | 0 | 0 | 0 |
| 2b | C | <--------------------- Lines - 1 ---------------------> ||||||||||||||||
| 3a | X | <--------------- FRAM Start Address (MS) --------------> ||||||||||||||||
| 3b | C | <--------------- FRAM Start Address (LS) --------------> ||||||||||||||| 0 |

Background: The MX 42 reads back words from the first
line, followed by all words in the second
line, etc., until all lines have been
readback. All data will be written
sequentially into FRAM in a linearized
fashion. This is an effective way of
caching a character once its bitmap has been
constructed in OPU page memory. It should
be noted that data readback from OPU page
memory will have been previously conditioned
based on the conditioning features that were
in effect at the time of the original
mapping (de.g. shift, tint, texture,
clipping window). The referenced region
must be square with the XY axis.

Usage: Xi = destination coordinate of lower left
hand corner of the rectangular region to be
read.

Yi = destination coordinate of lower left
hand corner of the rectangular region to be
read.

CP# = Color Plane # of page memory on OPU to be read from. Serial color mode must be used and is set by bit 4 in the CREG in step 1c. Any one of the 4 possible color planes can be read from assuming that the 3 extra memory planes are provided.

Words/Line = height of the region in words. Minimum W/L = 1.

Lines - 1 = one less than the total number of lines representing the width of the region.

FRAM Start Address = Starting location in FRAM where referenced region is to be written.

We claim:

1. A raster image processor for receiving print instructions, converting the print instructions to a bitmap pattern, and driving an all points addressable marking engine with the bitmap pattern, comprising:
   at least three digital processing units arranged in a parallel processing pipeline, including:
   master processing unit means for receiving print instructions and decoding the print instructions to produce rendering commands for constructing pages and documents to be printed, managing layout of pages being constructed, managing fonts, and controlling the marking engine;
   a first dedicated bus connected to said master processing unit means;
   mapper accelerator unit means connected to said first dedicated bus, and including a font memory storing bitmaps and an application specific computer for receiving said rendering commands over said first dedicated bus and retrieving bitmaps from said font memories;
   a second dedicated bus connected to said mapper accelerator unit means;
   output processor unit means, including a bitmap page buffer and a microprocessor connected to said second dedicated bus for receiving said bitmaps over said second dedicated bus, storing said bit maps in said page buffer, and supplying the bit maps from said page buffer to said marking engine; and
   communication and control bus means connected to said master processing unit means, said mapper accelerator unit means, and said output processor unit means and for providing overall control communications between said unit means.

2. The raster image processor claimed in claim 1, further comprising a job communication and control communication link connected between said master processing unit means and said marking engine for communicating marking engine control signals separate from the bitmaps.

3. The raster image processor claimed in claim 1, wherein said master processing unit means comprises a programmed microcomputer.

4. The raster image processor claimed in claim 3, further comprising disk memory means connected to the master processing unit for storing a control program for the master processing unit, that is down loaded to the master processing unit upon start up.

5. The raster image processor claimed in claim 4, wherein the master processing unit further comprises service manager module means for enabling a portable service microcomputer to be connected to the disk memory means and the master processing unit for executing diagnostic programs.

6. The raster image processor claimed in claim 1, wherein said mapper accelerator unit means comprises a bit slice architecture custom integrated circuit functioning as a dedicated slave co-processor to the master processing unit.

7. The raster image processor claimed in claim 6, wherein the mapper accelerator unit means is controlled by a control word having bit assignments for every function performed by the mapper accelerator unit means.

8. The raster image processor claimed in claim 7, where the functions performed by the mapper accelerator unit means includes; read object source memory; condition data; maintain counters, (i.e. height word and XY) and write to object destination memory.

9. The raster image processor claimed in claim 8, wherein said data condition function includes rotating font data by 180° and mirroring font data about a vertical axis.

10. The raster image processor claimed in claim 1, wherein said output processing unit means comprises a programmable microcontroller, two random access page memories, and a multiplexer controlled by the microcontroller for reading bitmap data into one of said memories while reading data out of said other memory.

11. The raster image processor claimed in claim 1, wherein the mapper accelerator unit means includes data conditioner means for performing a logical OR on previous data with next data in a scan line.

12. The raster image processor claimed in claim 1, wherein the master processing unit means comprises:
   input manager means for reading input data expressed in one of a plurality of page description languages;
   first decoder means for decoding data expressed in the plurality of page description languages into a set of common level raster image processor instructions; and
   second decoder means for decoding the common level raster image processor instructions into said rendering commands.

13. The raster image processor claimed in claim 12, wherein said decoder means comprises means for decoding input data representing a form, wherein a form is made up of a constant set of linked functions that support interaction with variable data to produce a filled out form.

14. A raster image processor for a marking engine, comprising:
   a master processor receiving print instructions and producing rendering commands;
   a first dedicated bus connected to said master processor unit and carrying the rendering commands;
   a mapper accelerator connected to said first dedicated bus and receiving the rendering commands and producing bitmaps;
   a second dedicated bus connected to said mapper accelerator unit and carrying the bitmaps;
   an output processor connected to said second dedicated bus, receiving the bitmaps and providing the bitmaps to said marking engine; and
   a control information bus connected to said master processor, said mapper accelerator and said output processor and carrying control communications between said master processor, said mapper accelerator and said output processor.

15. A raster image processor for a marking engine, comprising:
   a master processor receiving print instructions and producing rendering commands;
   a mapper accelerator unit connected to said master processor to receive the rendering commands, said mapper accelerator unit comprising first and second data conditioning units operating in parallel and each performing different print data conditioning operations responsive to the rendering commands; and
   an output processor connected to said mapper accelerator unit and providing conditioned data to the marking engine.

16. A processor as recited in claim 15, wherein said first data conditioning unit comprises a pipeline of data conditioning devices.

17. A processor as recited in claim 15, further comprising:
   a first dedicated bus connected between said master processor and said mapper accelerator unit and carrying the rendering commands;
   a second dedicated bus connected between said mapper accelerator unit and said output processor and carrying the conditioned data; and
   a control communication bus has connected to said master processor, said mapper accelerator unit and said output processor.

* * * * *